(12) United States Patent
Ogawa

(10) Patent No.: US 10,319,015 B2
(45) Date of Patent: Jun. 11, 2019

(54) DISPLAY METHOD FOR DISPLAYING INFORMATION DESIRED BY A USER

(71) Applicant: Panasonic Intellectual Property Corporation of America, Torrance, CA (US)

(72) Inventor: Kento Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 810 days.

(21) Appl. No.: 14/296,597

(22) Filed: Jun. 5, 2014

(65) Prior Publication Data
US 2015/0134375 A1 May 14, 2015

(30) Foreign Application Priority Data
Nov. 8, 2013 (JP) .................. 2013-232593

(51) Int. Cl.
*G06Q 10/02* (2012.01)
*G06Q 30/06* (2012.01)
*G06F 3/147* (2006.01)

(52) U.S. Cl.
CPC ......... *G06Q 30/0623* (2013.01); *G06F 3/147* (2013.01); *G06Q 10/02* (2013.01); *G09G 2354/00* (2013.01); *G09G 2370/027* (2013.01)

(58) Field of Classification Search
CPC ........ G06Q 10/02; G06Q 50/10; G06Q 50/12; G06Q 50/14; G06Q 50/30; G06Q 30/0623; G06T 19/006
See application file for complete search history.

(56) References Cited

U.S. PATENT DOCUMENTS

| | | | |
|---|---|---|---|
| 8,131,118 B1 * | 3/2012 | Jing | G01C 21/20 382/305 |
| 8,825,083 B1 * | 9/2014 | Pedregal | G06Q 30/0269 455/456.3 |

(Continued)

FOREIGN PATENT DOCUMENTS

| | | |
|---|---|---|
| JP | 2002-269217 | 9/2002 |
| JP | 2005-31780 | 2/2005 |

(Continued)

OTHER PUBLICATIONS

Julier, et al., Information Filtering for Mobile Augmented Reality, Proc. 2000 IEEE Int'l Symp. Augmented Reality, IEEE Press, Piscataway, N.J., 2000, pp. 3-11.*

(Continued)

*Primary Examiner* — Daniel Vetter
(74) *Attorney, Agent, or Firm* — Wenderoth, Lind & Ponack, L.L.P.

(57) ABSTRACT

A display method including: performing (S10) a service application that is an application for at lease one of services of a specific event, using an information terminal; obtaining (S11) a plurality of event information items by the information terminal through visible light communication with a display that displays the event information items, the information terminal being held toward a screen of the display; and displaying (S12), when the event information items obtained in the obtaining (S11) include related information, the related information on a display unit of the information terminal, the related information being information related to contents of the at least one of the services.

7 Claims, 38 Drawing Sheets

(a)

(b)

(56) References Cited

U.S. PATENT DOCUMENTS

| | | | | |
|---|---|---|---|---|
| 2010/0115459 A1* | 5/2010 | Kinnunen | G01C 21/20 | 715/785 |
| 2010/0228632 A1* | 9/2010 | Rodriguez | G06Q 30/0269 | 705/14.66 |
| 2011/0098056 A1* | 4/2011 | Rhoads | G06Q 10/10 | 715/863 |
| 2011/0145073 A1* | 6/2011 | Richman | G06Q 30/02 | 705/14.66 |
| 2012/0078667 A1* | 3/2012 | Denker | G06Q 10/02 | 705/5 |
| 2012/0207441 A1* | 8/2012 | Hymel | G06Q 50/10 | 386/230 |
| 2013/0086530 A1* | 4/2013 | Gandhi | G06F 3/0488 | 715/862 |
| 2013/0212065 A1* | 8/2013 | Rahnama | G06F 17/30002 | 707/609 |
| 2013/0249948 A1* | 9/2013 | Reitan | G06F 3/011 | 345/633 |
| 2013/0268304 A1* | 10/2013 | Doshi | G06Q 10/02 | 705/5 |
| 2014/0085400 A1* | 3/2014 | Kaus | G06Q 10/02 | 348/14.03 |
| 2014/0095223 A1* | 4/2014 | Oxenham | G06Q 10/02 | 705/5 |
| 2015/0317569 A1* | 11/2015 | Renaudie | G06Q 10/02 | 705/5 |

FOREIGN PATENT DOCUMENTS

| | | |
|---|---|---|
| JP | 2011-61305 | 3/2011 |
| JP | 2012-113655 | 6/2012 |

OTHER PUBLICATIONS

Julier, et al., Information Filtering for Mobile Augmented Reality, IEEE Computer Graphics and Applications, vol. 22, Iss. 5, Sep./Oct. 2002, pp. 12-15.*

* cited by examiner

FIG. 4

| Management number | | Service application information |
|---|---|---|
| 01 | Airplane | Scheduled: Xth day of Xth month 11:25  To: Jakarta  Flight: JO725  Airline: JAL |
| 02 | Shinkansen | Nozomi 211  Xth day of Xth month departure 8:47  For Shin-Osaka  Non-reserved Cars 1 to 3 |
| 03 | Seminar | Xth day of Xth month  Conference Center 3F  2009 Fall PS group's new product workshop |
| | | |

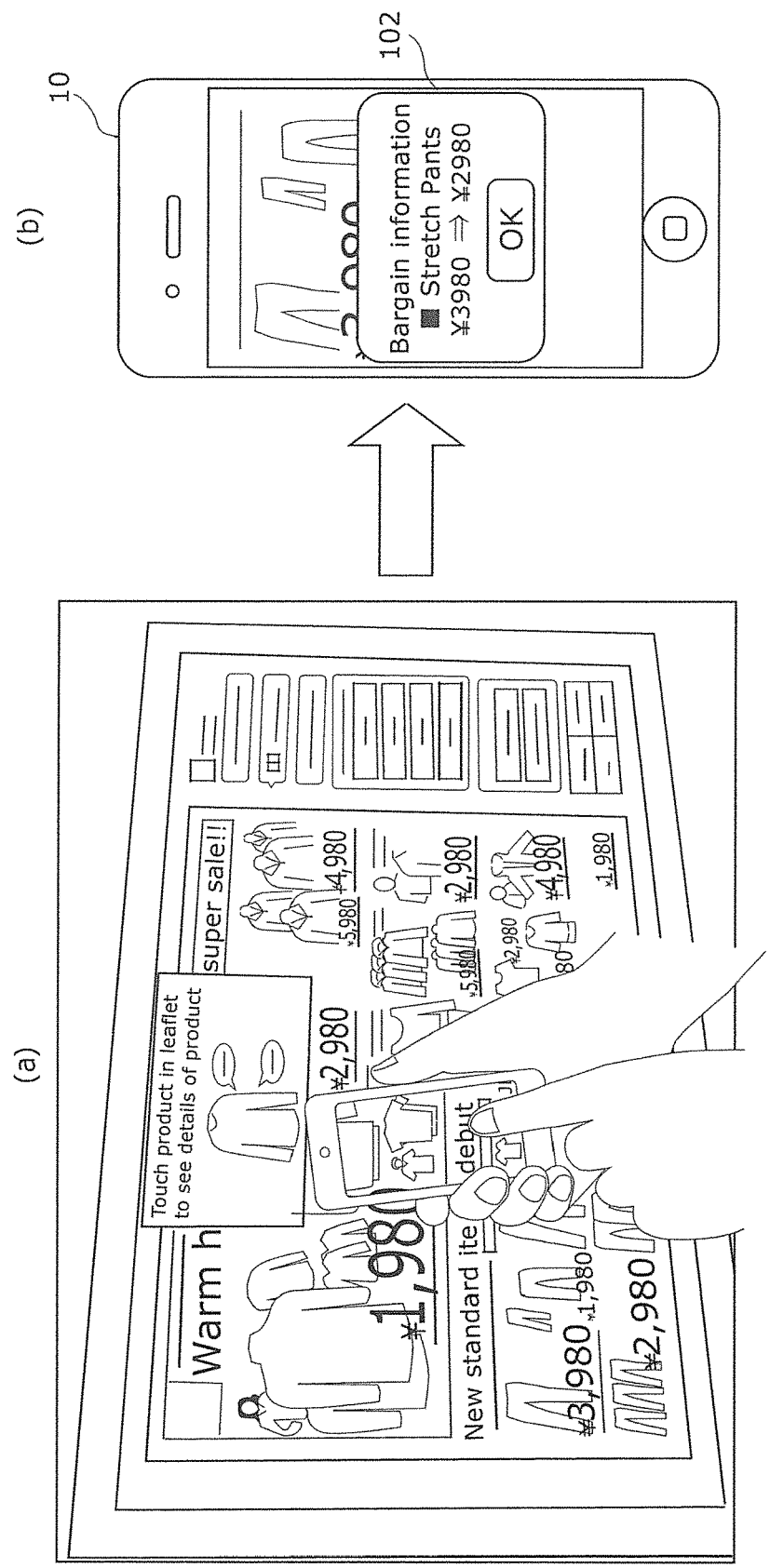

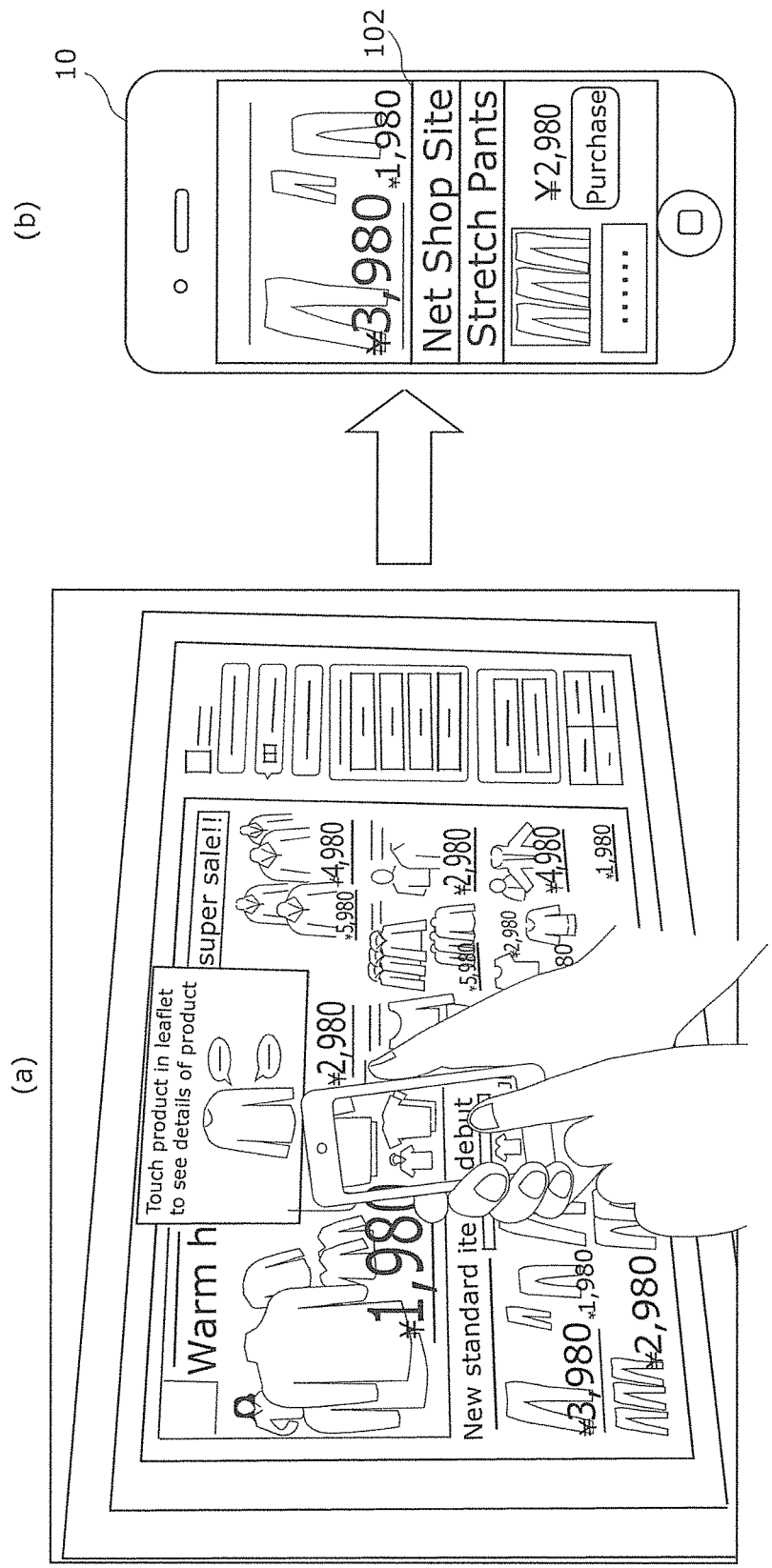

DISPLAY METHOD FOR DISPLAYING INFORMATION DESIRED BY A USER

CROSS REFERENCE TO RELATED APPLICATION

This application claims the benefit of priority of Japanese Patent Application Number 2013-232593, filed Nov. 8, 2013, the entire content of which is hereby incorporated by reference.

FIELD

The present invention relates to a display method.

BACKGROUND

In recent years digital signage systems (e.g. digital signage) have been widely used. Accordingly, there have been expectations for a technique for obtaining, from a digital signage system, information about a product or the like displayed in a digital signage, and displaying the information, using an information terminal, for instance.

Patent Literature (PTL) 1 has suggested, for example, a guidance display system and a guidance display method that make it possible to simultaneously obtain guidance image information and related information thereof by using augmented reality technology and visible light communication in combination. PTL 1 discloses a technique for superimposing, on a captured image, additional information about a region (captured image) of a digital signage captured by an information terminal, and displaying the captured image.

CITATION LIST

Patent Literature

[PTL 1] Japanese Unexamined Patent Application Publication No. 2011-61305

SUMMARY

Technical Problem

With the above conventional technique, however, a user having an information terminal needs to find a desired region while watching a digital signage, and capture the desired region by oneself. In other words, with the conventional technique, it takes some time to obtain information desired by the user.

The present invention has been conceived in view of the above situation, and an object of the present invention is to provide a display method that makes it possible to obtain information desired by a user from a display without taking much time, and display the information on an information terminal.

Solution to Problem

In order to achieve the above object, a display method according to an aspect of the present invention includes: performing a service application for a specific event using an information terminal; obtaining a plurality of event information items by the information terminal through visible light communication with a display that displays the event information items, the information terminal being held toward a screen of the display to perform the visible light communication; and displaying, when the event information items obtained in the obtaining include related information, the related information on a display unit of the information terminal, the related information being information related to contents of the service application.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A display method according to the present invention makes it possible to obtain information desired by a user from a display without taking much time, and cause an information terminal to display the information.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram showing an exemplary data structure of service application information according to Embodiment 1.

FIG. 39 is a diagram showing an exemplary alert displayed on a display unit of an information terminal according to an other embodiment.

FIG. 40 is a diagram showing an exemplary alert displayed on a display unit of an information terminal according to an other embodiment.

DESCRIPTION OF EMBODIMENTS

Figure 1:
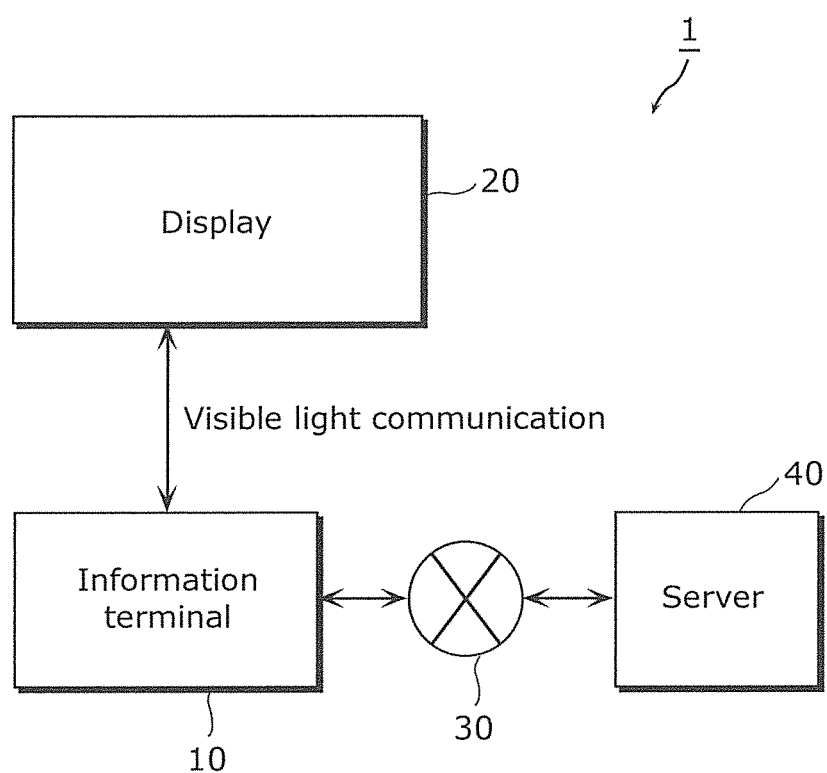
FIG. 1 is a diagram showing an exemplary entire configuration of a display system according to Embodiment 1.

In order to achieve the above object, a display method according to an aspect of the present invention includes: performing a service application for a specific event using an information terminal; obtaining a plurality of event information items by the information terminal through visible light communication with a display that displays the event information items, the information terminal being held toward a screen of the display to perform the visible light communication; and displaying, when the event information items obtained in the obtaining include related information, the related information on a display unit of the information terminal, the related information being information related to contents of the service application.

With this, even when not selecting a desired area of the screen of the display such as a digital signage, a user using the information terminal can obtain information desired by the user from the display without taking much time, and cause the information terminal to display the information.

Moreover, for instance, the performing may include storing, into the information terminal, service application information indicating the contents of the service application, and the displaying may include comparing the service application information stored into the information terminal in the storing, and the event information items obtained in the obtaining, and determining that the event information items include the related information when the event information items include information suggesting the service application information, the comparing and determining being performed by the information terminal.

Furthermore, for example, the performing may include storing, into a server, service application information indicating the contents of the service application, and the displaying may include comparing the service application information stored into the server in the storing, and the event information items obtained in the obtaining, and determining that the event information items include the related information when the event information items include information suggesting the service application information, the comparing and determining being performed by the server.

Moreover, for instance, the performing may include: storing, into an other server different from a server, service application information indicating the contents of the service application; and transmitting, from the other server to the server, the service application information stored in the storing, and storing the service application information into the server, and the displaying may include comparing the service application information stored in the transmitting and storing, and the event information items obtained in the obtaining, and determining that the event information items include the related information when the event information items include information suggesting the service application information, the comparing and determining being performed by the server.

Furthermore, for example, the performing may include: storing, into a server, service application information indicating the contents of the service application; and transmitting, from the server to the information terminal, the service application information stored in the storing, and storing the service application information into the information terminal, and the displaying may include comparing the service application information stored into the information terminal in the transmitting and storing, and the event information items obtained in the obtaining, and determining that the event information items include the related information when the event information items include information suggesting the service application information, the comparing and determining being performed by the information terminal.

Moreover, for instance, the obtaining may include: obtaining ID information by the information terminal performing visible light communication with the display, and transmitting the obtained ID information to the server; and obtaining, by the server, the event information items as information items associated with the ID information transmitted in the obtaining and transmitting.

Furthermore, for example, the service application may include at least one of: a reservation and purchase of an exhibition ticket; a reservation and purchase of an exposition ticket; a reservation and purchase of a show ticket; a reservation and purchase of a concert ticket; a reservation and purchase of an entry or audience ticket for an athletic event; a reservation and purchase of a lecture ticket; a reservation for a seminar; a reservation at a restaurant; a reservation for and a purchase of an automobile; a reservation and purchase of a boarding ticket; a reservation and purchase of an airplane ticket; or a reservation and purchase of a boat ticket.

Moreover, for instance, the display method may include causing the information terminal to issue, when at least part of the contents of the service application included in the related information is changed, an alert that is information about the at least changed part of the contents.

Furthermore, for example, in the displaying, information included in the related information and indicating the contents of the service application may be emphatically displayed.

Moreover, for instance, in the displaying, the related information may be displayed on the display unit of the information terminal in a format in which the event information items are displayed on the screen of the display, and the format may include a character displayed on the screen, a background color, and style information.

Furthermore, for example, in the displaying, information that is included in the related information and is other than the information indicating the contents of the service application may be further displayed grayed out on the display unit of the information terminal.

Moreover, for instance, in the displaying, when at least part of the contents of the service application included in the related information is changed, out of the related information, information about the at least changed part of the contents may be displayed larger than information about remaining part of the contents that is not changed.

Furthermore, for example, in the displaying, the event information items may be displayed on the display unit of the information terminal, and the related information, among the event information items, may be emphatically displayed on the display unit of the information terminal.

Moreover, in order to achieve the above object, a display method according to one aspect of the present invention includes: registering, using an information terminal, attribute information about a user with a server or the information terminal; obtaining a plurality of product information items by the information terminal through visible light communication with a display that displays the product information items, the information terminal being held toward a screen of the display to perform the visible light communication; and extracting, from the product information items obtained in the obtaining, a specific product information item suitable for the attribute information about the user registered in the registering, and displaying the extracted specific product information item on a display unit of the information terminal.

Here, for instance, the attribute information may include at least one of a gender or an age of the user, each of the product information items may include, in addition to information about a product, at least one of gender information or age information suitable for the product, and the extracting and displaying may include extracting the specific product information item by comparing the gender of the user included in the attribute information and the gender information included in the product information item or comparing the age of the user included in the attribute information and the age information included in the product information item.

Furthermore, for example, the attribute information may include preference characteristics of the user, the display method may further include, in addition to or instead of the registering, determining the preference characteristics based on a purchase history of the user, and in the extracting and displaying, the specific product information item suitable for the attribute information may be extracted from the product information items obtained in the obtaining, using the preference characteristics determined in the determining.

Moreover, for instance, each of the product information items may include a price of a product, and the display method may further include: recording a plurality of past product information items obtained in the obtaining; and causing the information terminal to issue an alert when a price included in the specific product information item extracted in the extracting and displaying is included in the past product information items and is lower than a price included in a product information item corresponding to the specific product information item.

Furthermore, for example, each of the product information items may include stock information about a product, and in the extracting and displaying, when it is determined based on the stock information that a product indicated in the extracted specific product information item is out of stock, instead of the specific product information item, a web site for online shopping may be displayed on the display unit of the information terminal.

Moreover, for instance, the attribute information may further include language information for selecting a display language to be displayed on the display unit of the information terminal, and in the extracting and displaying, the specific product information item may be translated into the display language selected based on the language information, and be displayed.

Furthermore, for example, in the displaying, the related information may be further translated into a display language selected based on language information for selecting a display language to be displayed on the display unit of the information terminal, and be displayed It is to be noted that these generic and specific aspects may be implemented using a system, a method, an integrated circuit, a computer program, or a non-transitory computer-readable recording medium such as a compact disc read-only memory (CD-ROM), and may also be implemented by any combination of systems, methods, integrated circuits, computer programs, and recording media.

Hereinafter, an information management method and an information management system according to one aspect of the present invention are described with reference to the drawings.

It is to be noted that the exemplary embodiments described below each show a general or specific example. The numerical values, shapes, materials, structural elements, the arrangement and connection of the structural elements, steps, the order of the steps etc. shown in the following embodiments are mere examples, and therefore do not limit the present invention. In addition, among the structural elements in the following embodiments, structural elements not recited in any one of the independent claims are described as arbitrary structural elements.

(Embodiment 1)

1. Configuration of System

Hereinafter, a display system 1 according to Embodiment 1 is described with reference to the drawings.

1. 1 Entire Configuration of Display System 1

FIG. 1 is a diagram showing an exemplary entire configuration of a display system according to Embodiment 1. The display system 1 includes an information terminal 10, a display 20, and a server 40. The information terminal 10 and the server 40 are connected via a network 30.

Here, the information terminal 10 is a portable device such as a cellular phone, a smart phone, and a tablet. It is to be noted that the information terminal 10 is not limited to these examples, but may be any device, regardless of its type, capable of performing visible light communication with the display 20 and being connected to the server 40 via the network 30.

1.2 Use Situation of Display System 1

Figure 2:
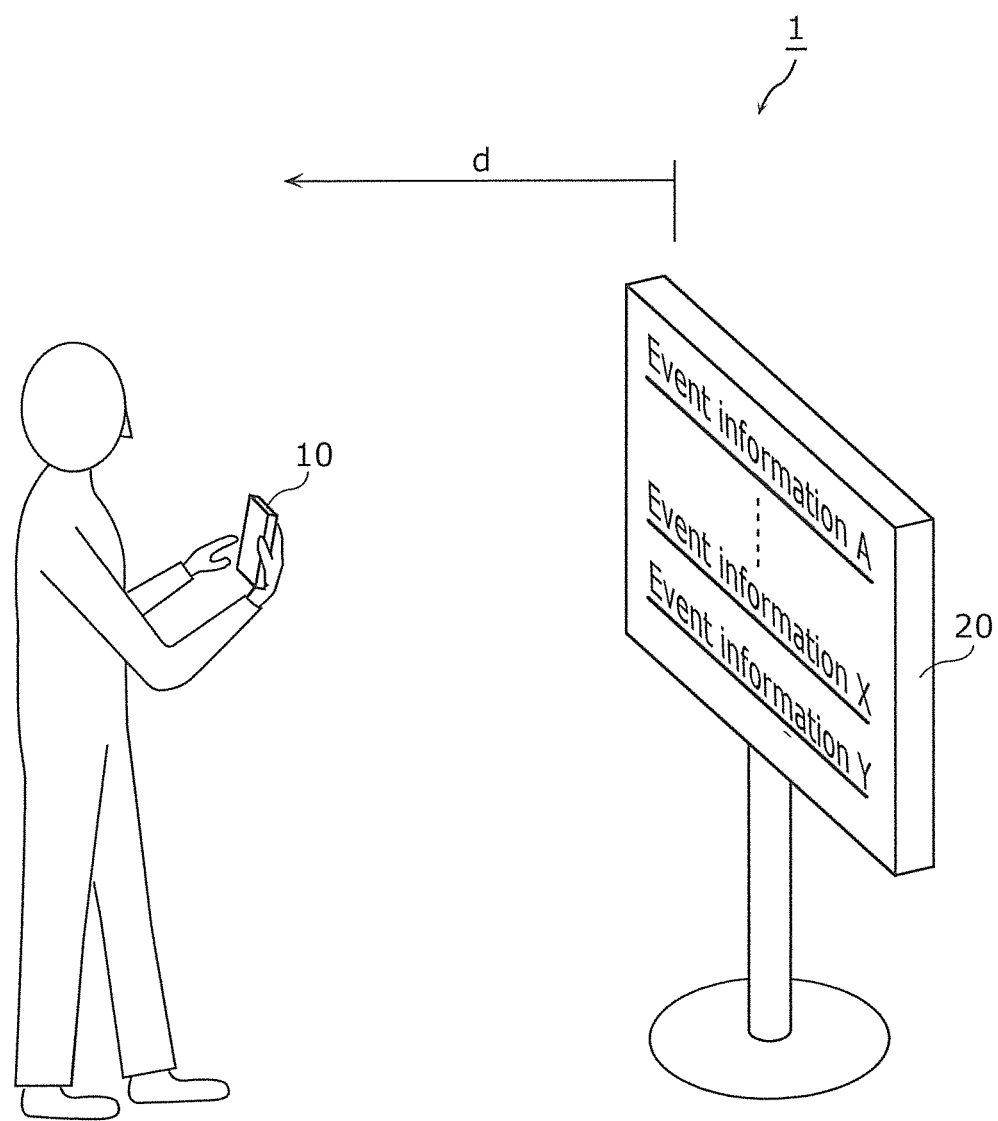
FIG. 2 is a diagram showing an exemplary use situation of the display system according to Embodiment 1.

FIG. 2 is a diagram showing an exemplary use situation of a display system according to Embodiment 1.

As shown in FIG. 2, the information terminal 10 is caused to perform visible light communication with the display 20 that displays event information items, by a user at a certain distance (a distance d in the figure) from the display 20 holding the information terminal 10 toward a screen of the display 20 (an operation of holding), and thus a display unit 102 of the information terminal 10 is successfully caused to display information. As will hereinafter be described in detail, in this embodiment, the information terminal 10 obtains event information items and displays on the display unit 102 information related to a service of an event (specific event) applied for by the user (related information).

Here, examples of the event include an exhibition, an exposition, a show, a concert, an athletic event, a lecture, a seminar, dining at a restaurant, renting or purchasing a car, bus ride, train ride, plane ride, and ship ride. Moreover, examples of a service application for an event include reserving or purchasing a ticket for an exhibition, an exposition, or a concert, applying for a lecture or a seminar, dining at a restaurant, purchasing a car, and reserving an airplane ticket.

1.3 Configuration of Information Terminal 10

Figure 3:
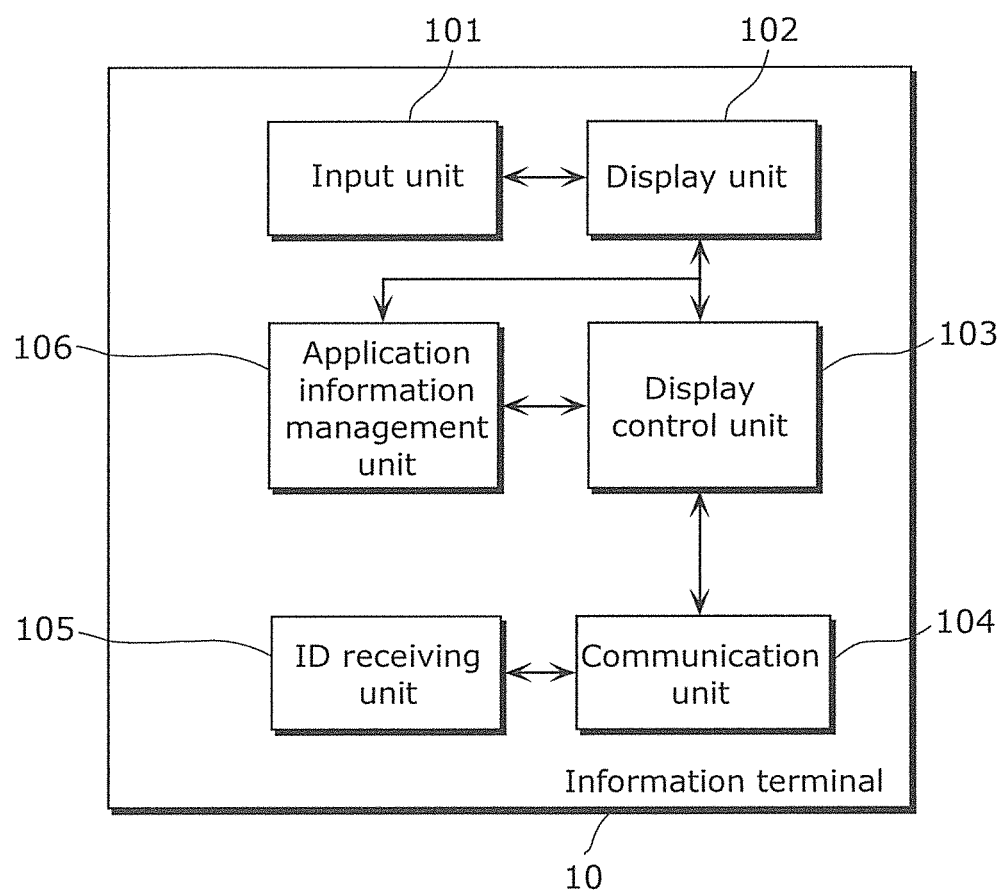
FIG. 3 is a block diagram showing an exemplary configuration of an information terminal according to Embodiment 1.

FIG. 3 is a block diagram showing an exemplary configuration of an information terminal according to Embodiment 1. FIG. 4 is a diagram showing an exemplary data structure of service application information according to Embodiment 1.

The information terminal 10 shown in FIG. 3 includes an input unit 101, a display unit 102, a display control unit 103, a communication unit 104, an ID receiving unit 105, and an application information management unit 106.

The input unit 101 detects an operation performed by the user using the information terminal 10, and receives information or the like inputted by the detected operation. Examples of the detected operation performed by the user include an operation of inputting user information, an operation of inputting a service application, and an operation of holding the information terminal 10 toward a display (hereinafter, referred to as an operation of holding). Here, the user information is user's personal information that can identify a user and includes attribute information that can identify a name, an address, a birth date, a gender, a hobby, and so on of the user. In this embodiment, the operation of inputting a service application means an operation of performing a service application for a specific event (an application for at least one of services).

The display unit 102 displays related information that is information related to a service application. In this embodiment, when event information items (also referred to as transmission event information items) obtained by the display control unit 103 include related information that is information related to a service application for a specific event, the display unit 102 displays only the related information.

The ID receiving unit 105 obtains ID information by the information terminal 10 performing visible light communication with the display 20. More specifically, when the input unit 101 detects the operation of holding toward the screen of the display 20, the ID receiving unit 105 receives the ID information from the display 20 through visible light communication.

Here, the ID information is identification information for identifying event information items displayed on the display 20. The ID information may be a unique ID composed of alphanumeric characters or a unique ID in an area, a building, or a room. Moreover, the ID information may include event information items displayed on the display 20.

It is to be noted that although the following description is given assuming that one ID information item is received from the display 20, the present invention is not limited to this. The ID information may be received one-by-one from each of certain areas of the display 20.

The application information management unit 106 manages user information and service application information in association with each other. In this embodiment, the application information management unit 106 stores the service application information indicating the contents of a service application for a specific event (at least one of services which is applied for by the user), and manages the user information and the service application information in association with each other. Moreover, the application information management unit 106 stores the user information received by the input unit 101. Here, the service application information is managed using, for instance, a data structure shown in FIG. 4. Examples of the service application include the details of an airplane or Shinkansen seat reservation and the contents of a seminar for which a ticket is purchased (in which participation is reserved). It is to be noted that the service application information is not limited to these examples, but may be, for example, the details of an exhibition, exposition, or concert ticket, the contents of a lecture to be attended, a reserved time at a restaurant and the details of a course menu, or the details of a rental car reservation.

The display control unit 103 obtains transmission event information items (the event information items displayed on the display 20) received from the server 40 and the service application information indicating the details of the service application made by the user of the information terminal 10, and transmits the related information included in the transmission event information items to the display unit 102.

More specifically, the display control unit 103 obtains ID information through visible light communication with the display 20, which displays the event information items, by the information terminal 10 being held toward the screen of the display 20, and transmits the obtained ID information to the server 40. Then, the display control unit 103 obtains, from the server 40, the transmission event information items (the event information items displayed on the display 20) as information items associated with the ID information. When the obtained transmission event information items include the related information that is the information related to the service application information, the display control unit 103 transmits the related information to the display unit 102 and causes the display unit 102 to display the related information.

Here, the display control unit 103 compares the service application information (information indicating the contents of a service applied for by the user) stored in the application information management unit 106 and the obtained transmission event information items (the event information items displayed on the display 20), and determines that the transmission event information items include the related information when the transmission event information items include information suggesting the service application information.

Here, the information suggesting the service application information may be a phrase indicating service application information or a thesaurus (a synonym or a phrase semantically indicating a similarity relation or inclusion relation) of a phrase indicating service application information. As just described, the information suggesting the service application information may be information (a phrase) that matches or is related to service application information and can identify the service application information.

The communication unit 104 communicates with the server 40 via the network 30. Specifically, the communication unit 104 transmits the ID information obtained from the display 20 to the server 40. Moreover, the communication unit 104 receives, from the server 40, the transmission event information items associated with the ID information, and transmits the transmission event information items to the display control unit 103.

As stated above, even when not selecting a desired area of the screen of the display 20 such as a digital signage, the user using the information terminal 10 can obtain the information desired by the user from the display 20 without taking much time, and cause the information terminal 10 to display the information. More specifically, the information terminal 10 is capable of: obtaining the event information items through visible light communication with the display 20, which displays the event information items, by the information terminal 10 being held toward the screen of the display 20; and displaying, on the display unit 102, the related information about the service applied for by the user among the event information items.

1.4 Configuration of Display 20

Figure 5:
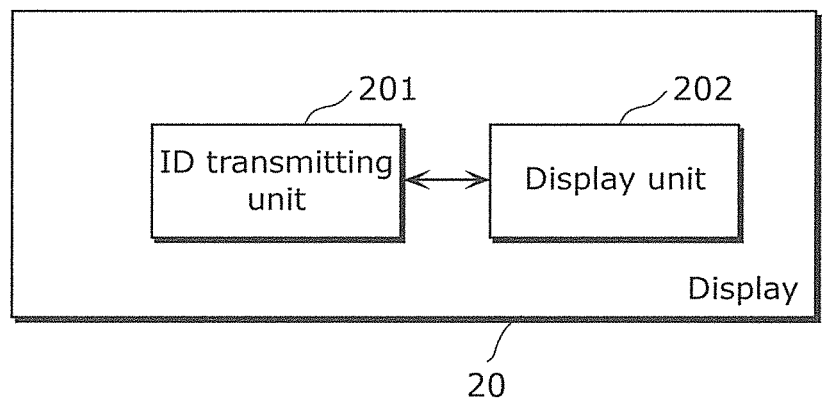
FIG. 5 is a block diagram showing an exemplary configuration of a display according to Embodiment 1.

FIG. 5 is a block diagram showing an exemplary configuration of a display according to Embodiment 1.

The display 20 is an exemplary display that displays event information items, and includes an ID transmitting unit 201 and a display unit 202.

The ID transmitting unit 201 performs visible light communication to transmit ID information for identifying event information items displayed on the display 20. More specifically, the ID transmitting unit 201 causes the event information items to be displayed on the screen of the display 20 and continuously transmits the ID information by causing a light to be dimmed (to be put out) or the like for a predetermined period.

The display unit 202 displays the event information items and dims (puts out) a light in a pattern indicating the ID information for a predetermined period during which the event information items are displayed.

As stated above, the display 20 displays the event information items and transmits, using visible light (visible light communication), the ID information for identifying the event information items.

1.5 Configuration of Server 40

Figure 6:
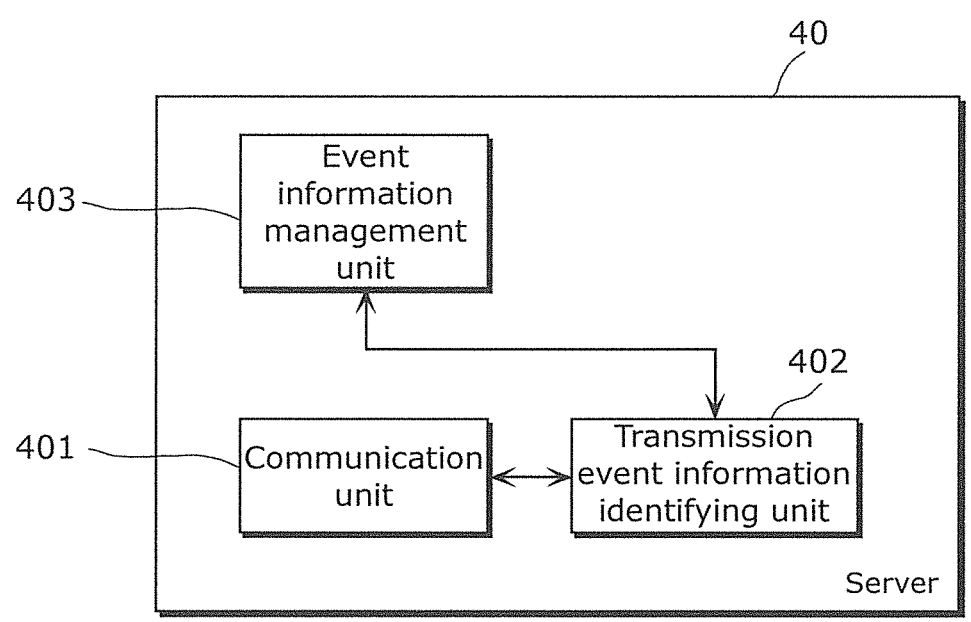
FIG. 6 is a block diagram showing an exemplary configuration of a server according to Embodiment 1.

FIG. 6 is a block diagram showing an exemplary configuration of a server according to Embodiment 1.

The server 40 includes a communication unit 401, a transmission event information identifying unit 402, and an event information management unit 403.

The communication unit 401 communicates with the information terminal 10 via the network 30. Specifically, the communication unit 401 receives ID information transmitted by the information terminal 10. Moreover, the communication unit 401 transmits transmission event information items associated with the ID information to the information terminal 10.

The transmission event information identifying unit 402 identifies and obtains, as the transmission event information items, event information items displayed on the display 20 as information items associated with the ID information transmitted by the information terminal 10 (ID information transmitted by the display 20). The transmission event information identifying unit 402 transmits the transmission event information items to the information terminal 10 via the communication unit 401.

The event information management unit 403 manages ID information and event information items in association with each other. In this embodiment, the event information management unit 403 manages ID information transmitted by the display 20 and the event information items displayed on the display 20, in association with each other.

As stated above, the server 40 identifies the event information items displayed on the display 20 from the ID information transmitted by the information terminal 10, and transmits the identified event information items as the transmission event information items to the information terminal 10.

1.6 Operations of Display System 1

Next, operations of the display system 1 are described.

Figure 7:
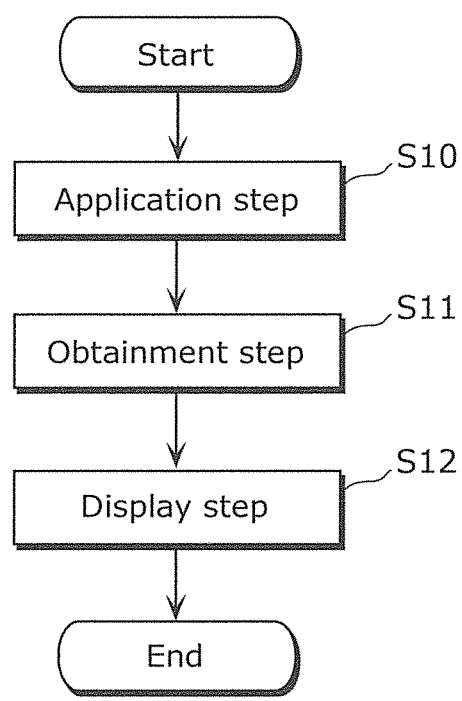
FIG. 7 is a flow chart showing a processing flow of a display method performed by a display system according to Embodiment 1.

FIG. 7 is a flow chart showing a processing flow of a display method performed by a display system according to Embodiment 1.

First, a user performs an application step using the information terminal 10 (S10). More specifically, the user performs a service application for a specific event (an application for at least one of services), using the information terminal 10.

In this embodiment, S10 includes a storage step for storing, into the information terminal 10, service application information indicating the contents of, among services, a service of a specific event (a service application) which is applied for by the user.

Next, the information terminal 10 performs an obtainment step (S11). More specifically, by the user holding the information terminal 10 toward the screen of the display 20 that displays event information items, the information terminal 10 obtains the event information items through visible light communication with the display 20.

Next, the information terminal 10 performs a display step (S12). More specifically, when the event information items obtained in S11 include related information that is information related to the service application information, the information terminal 10 displays the related information on the display unit 102 thereof.

In this embodiment, 512 includes a determination step for comparing the service application information stored in the information terminal 10 in the storage step included in S10 and the event information items obtained in S11, and determining that the event information items include the related information when the information terminal 10 determines that the event information items include information suggesting the service application information, the determination step being performed by the information terminal 10.

Next, a more specific processing flow of the display system according to Embodiment 1 is described.

Figure 8:
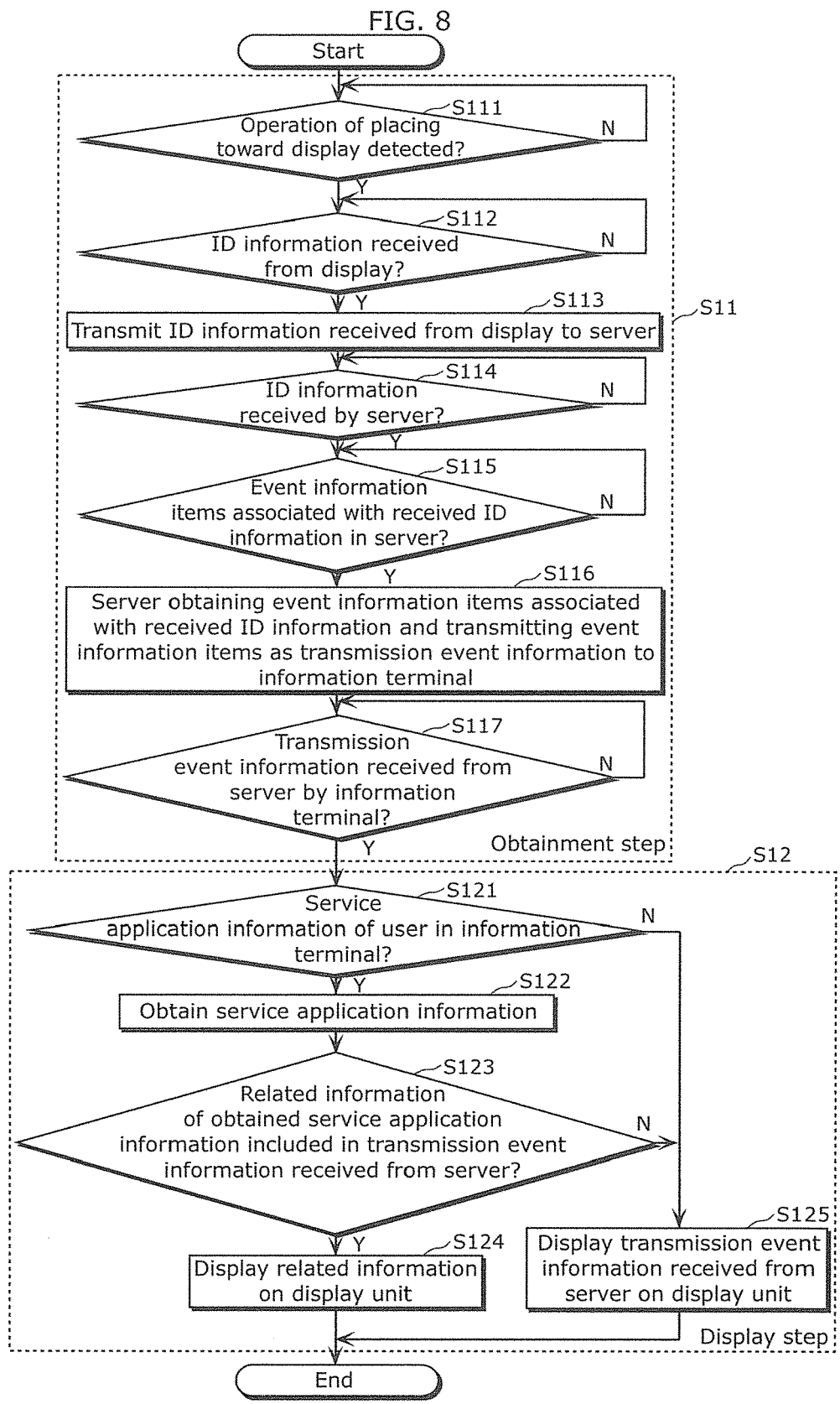
FIG. 8 is a flow chart showing a specific processing flow of the display method according to Embodiment 1.

FIG. 8 is a flow chart showing a specific processing flow of the display method according to Embodiment 1.

Here, it is assumed that the application step of S10 has been completed. It is also assumed that the user starts an application for visible light communication of the information terminal 10 and performs an operation of holding the information terminal 10 toward the display 20 that displays the event information items, to determine whether the information related to the service applied for by the user is present by looking at the display 20 as shown in FIG. 2. It is to be noted that the information terminal 10 regularly determines whether the information terminal 10 has detected the operation of holding toward the display 20, after the application is started.

First, when having detected the operation of holding toward the display 20 (Y in S111), the information terminal 10 determines whether the information terminal 10 has received ID information from the display 20 through visible light communication (S112). It is to be noted that when not having detected the operation of holding toward the display 20 in S111 (N in S111), the information terminal 10 returns to S111 and continuously or intermittently (regularly) determines whether the information terminal 10 has detected the operation of holding toward the display 20.

Next, when having received the ID information from the display 20 (Y in S112), the information terminal 10 transmits the ID information received from the display 20 to the server 40 (S113). It is to be noted that when not having received the ID information from the display 20 in S112 (N in S112), the information terminal 10 may return to S112 and continue the determining until the information terminal 10 receives the ID information.

Next, the server 40 determines whether the server 40 has received the ID information (S114), and when having received the ID information (Y in S114), the server 40 determines whether event information items (transmission event information items) associated with the received ID information are in the server 40 (S115). It is to be noted that when not having received the ID information (N in S114), the server 40 returns to S114 and continuously or intermittently (regularly) determines whether the server 40 has received the ID information.

Next, when the event information items (transmission event information items) associated with the received ID information are in the server 40 (Y in S115), the server 40 obtains the event information items associated with the received ID information and transmits the event information items as the transmission event information items to the information terminal 10 (S116). It is to be noted that when the event information items (transmission event information items) associated with the received ID information are not in the server 40 (N in S115), the server 40 may return to S115 and continue the determining until the event information items associated with the ID information can be identified. Moreover, the server 40 may query another server via the network 30 to obtain the event information items associated with the ID information.

Next, when having received the transmission event information items from the server 40 (Y in S117), the information terminal 10 determines whether service application information of the user is in the information terminal 10 (S121). It is to be noted that when having not received the transmission event information items from the server 40 in S117 (N in S117), the information terminal 10 may return to S117 and continue the determining until the information terminal 10 receives the transmission event information items.

As stated above, the obtainment step of S11 is specifically performed by performing the processes of S111 to S117.

Next, when the service application information of the user is in the information terminal 10 (Y in S121), the information terminal 10 obtains the service application information (S122) and determines whether the transmission event information items received from the server 40 include related information of the service application information (S123).

Next, when the transmission event information items received from the server 40 include the related information of the service application information (Y in S123), the information terminal 10 displays the related information on the display unit 102 (S124).

It is to be noted that when the service application information of the user is not in the information terminal 10 in S121, and the transmission event information items received from the server 40 do not include the related information of the service application information (N in S123), the information terminal 10 directly displays the transmission event information items received from the server 40 on the display unit 102 (S125).

1.7 Effect

As described above, according to Embodiment 1, the service application information items are managed by the information terminal 10, and the related information is identified. By performing the operation of holding the information terminal 10 toward the screen of the display 20, the user can cause the display unit 102 of the information terminal 10 to display the information (the related information) related to the contents (the service application information) of the service applied for by the user among the event information items.

With this, even when not selecting a desired area of the screen of the display 20 such as a digital signage, the user using the information terminal 10 can obtain the information desired by the user from the display 20 without taking much time, and cause the information terminal 10 to display the information.

Here, the related information displayed on the display unit 102 is described using an example.

Each of FIGS. 9 to 12 is a diagram showing exemplary related information displayed on a display unit of an information terminal according to Embodiment 1.

Figure 9:
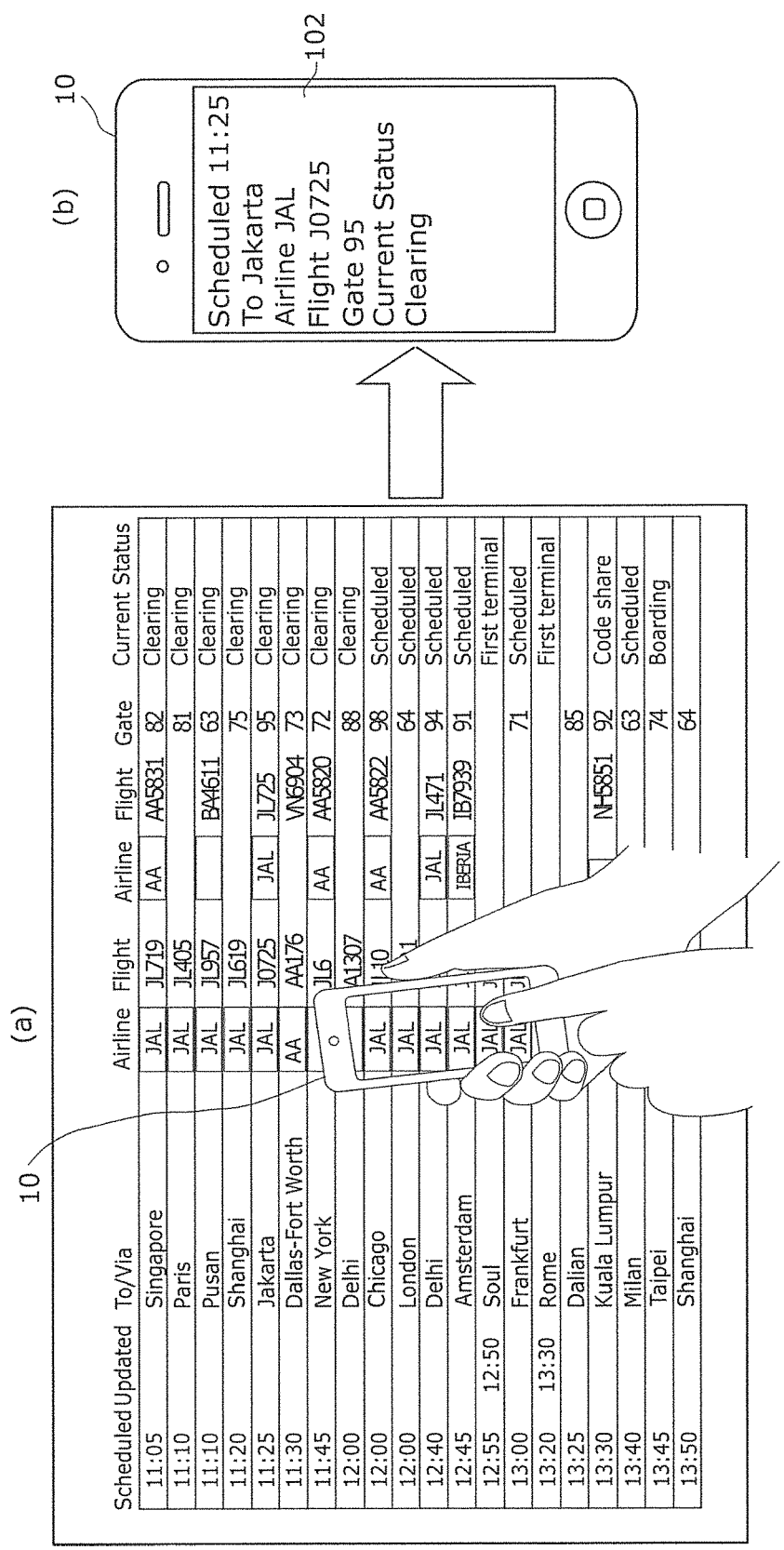
FIG. 9 is a diagram showing exemplary related information displayed on a display unit of the information terminal according to Embodiment 1.

For instance, as shown in FIG. 9, the user can look at the display 20 that displays, as event information items, gates and scheduled takeoff times for airplanes, to check whether information related to an airplane seat (service application information) reserved by the user is present. In other words, by the user performing the operation of holding the information terminal 10 toward the display 20 that displays the gates and the scheduled takeoff times for the airplanes, the display unit 102 of the information terminal 10 is caused to display, when the display 20 displays an airplane the user will board, information such as a boarding time and a gate as related information.

Figure 10:
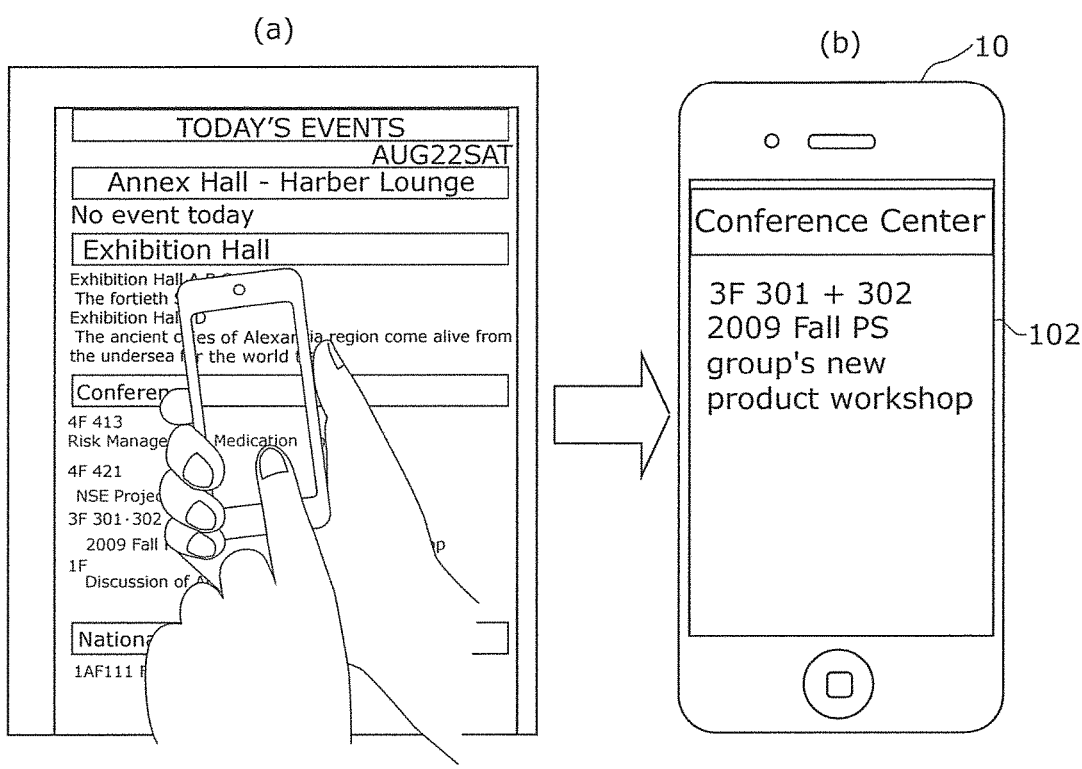
FIG. 10 is a diagram showing exemplary related information displayed on the display unit of the information terminal according to Embodiment 1.

Moreover, for example, as shown in FIG. 10, the user can look at the display 20 that displays, as event information items, notices for today's events, to check whether information related to a workshop (service application information) applied for by the user is present. In other words, by the user performing the operation of holding the information terminal 10 toward the display 20 that displays the today's events, the display unit 102 of the information terminal 10 is caused to display, when the display 20 displays a notice for the workshop applied for by the user, information such as a number of a conference room for the workshop as related information.

It is to be noted that any format in which related information is displayed on the display 102 will do, but a format used for the screen of the display 20 may be used for the display unit 102. Specifically, the related information is displayed on the display unit 102 of the information terminal 10 in a format in which event information items are displayed on the screen of the display 20, and the format may include characters displayed on the screen, a background color, and style information. Here, information that is included in the related information and is other than information indicating the contents of a service application (a service applied for by the user) may be displayed grayed out on the display unit 102 of the information terminal 10. With this, it is possible to emphatically display the contents of the service application, and thus the user can more easily recognize the information indicating the contents of the service application.

Figure 11:
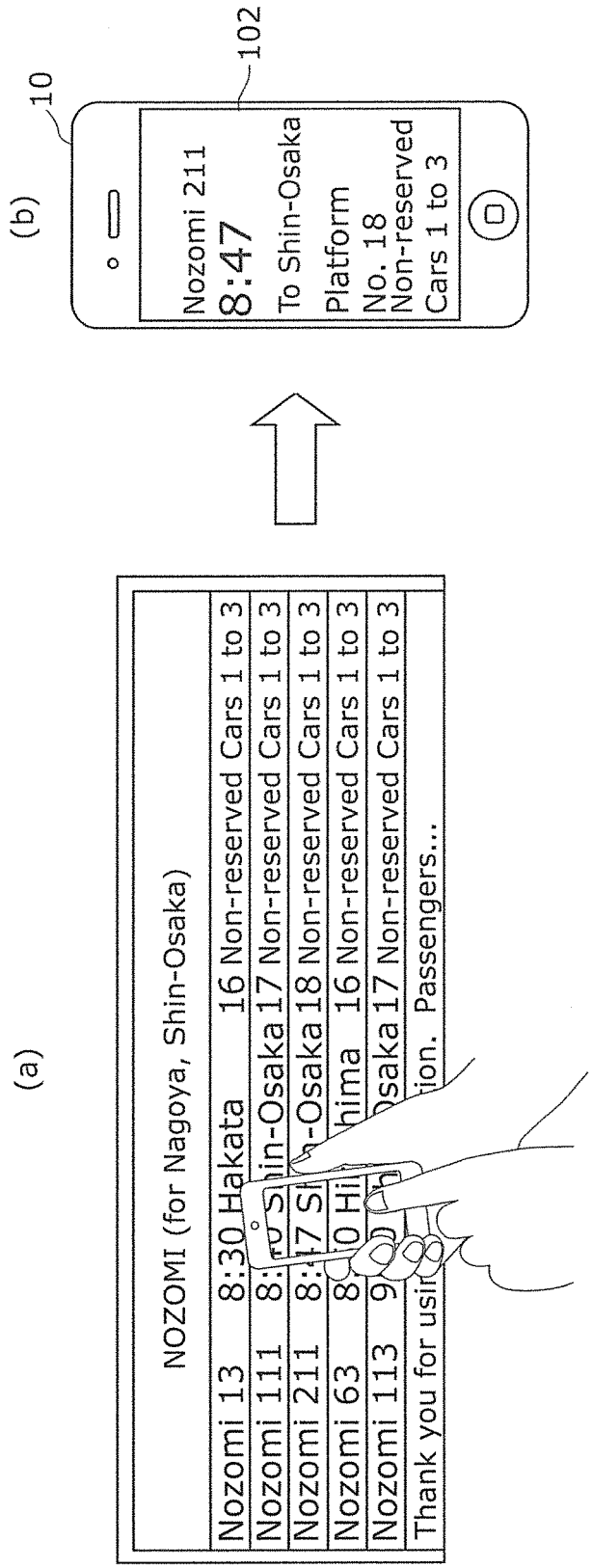
FIG. 11 is a diagram showing exemplary related information displayed on the display unit of the information terminal according to Embodiment 1.

Furthermore, for instance, as shown in FIG. 11, the user can look at the display 20 that displays, as event information items, departure times, departure platforms, and so on for Shinkansen, to check whether information (service application information) related to a Shinkansen seat reserved by the user is present. In other words, by the user performing the operation of holding the information terminal 10 toward the display 20 that displays the departure times, the departure platforms, and so on for Shinkansen, the display unit 102 of the information terminal 10 is caused to display, when the display 20 displays a departure time and the like for Shinkansen reserved by the user, information such as the departure time, a platform, and a destination or the like represented by a number or the like for Shinkansen as related information.

It is to be noted that any format in which related information is displayed will do, but a departure time and a platform that are important in the related information may be emphatically displayed. To put it another way, information included in the related information and indicating the contents of at least one service applied for by the user may be emphatically displayed. Here, when at least part of the contents of a service application (contents of the at least one service applied for by the user) included in the related information is changed, information about the at least changed part of the contents that is included in the related information may be displayed larger than information about the remaining part of the contents that is not changed. With this, it is possible to emphatically display the information about the at least changed part of the contents that is included in the related information, and thus the user can more easily recognize the information about the at least changed part of the contents.

Figure 12:
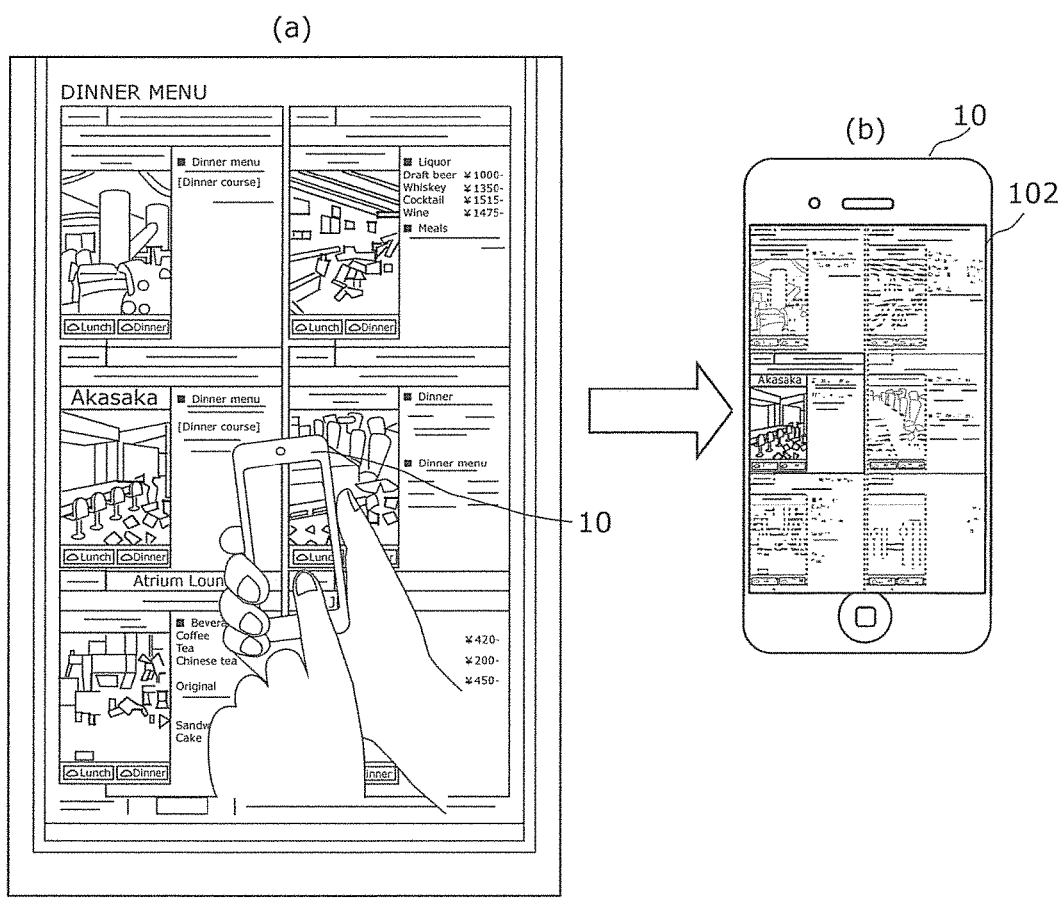
FIG. 12 is a diagram showing exemplary related information displayed on the display unit of the information terminal according to Embodiment 1.

Moreover, the event information items may be displayed on the display unit 102 of the information terminal 10, and the related information among the event information items may be displayed on the display unit 102 of the information terminal 10. For instance, as shown in FIG. 12, the user can look at the display 20 that displays, as event information items, information items about restaurants, to check whether information related to a restaurant (service application information) at which a table is reserved by the user is present. In other words, by the user performing the operation of holding the information terminal 10 toward the display 20 that displays the information items about the restaurants, the display unit 102 of the information terminal 10 is caused to display, when the display 20 displays the restaurant at which the table is reserved by the user, information such as a location (a tenant floor) of the restaurant as related information.

With this, by only holding the information terminal 10 toward the screen of the display 20 to cause the information terminal 10 to perform visible light communication with the display 20, the user can cause the display unit 102 of the information terminal 10 to display only the information related to the contents of a service applied for by the user. Stated differently, it is possible to obtain the information desired by the user without taking much time, and display the information.

(Embodiment 2)

Embodiment 1 has described the case where the information terminal 10 includes the application information management unit 106 and manages the user information and the service application information in association with each other, but the present invention is not limited to this. Embodiment 2 describes a case where a server includes an application information management unit and manages user information and service application information in association with each other, with reference to FIG. 13A to FIG. 14.

The following mainly describes differences from Embodiment 1.

2.1 Configuration of Information Terminal 10A

Figure 13A:
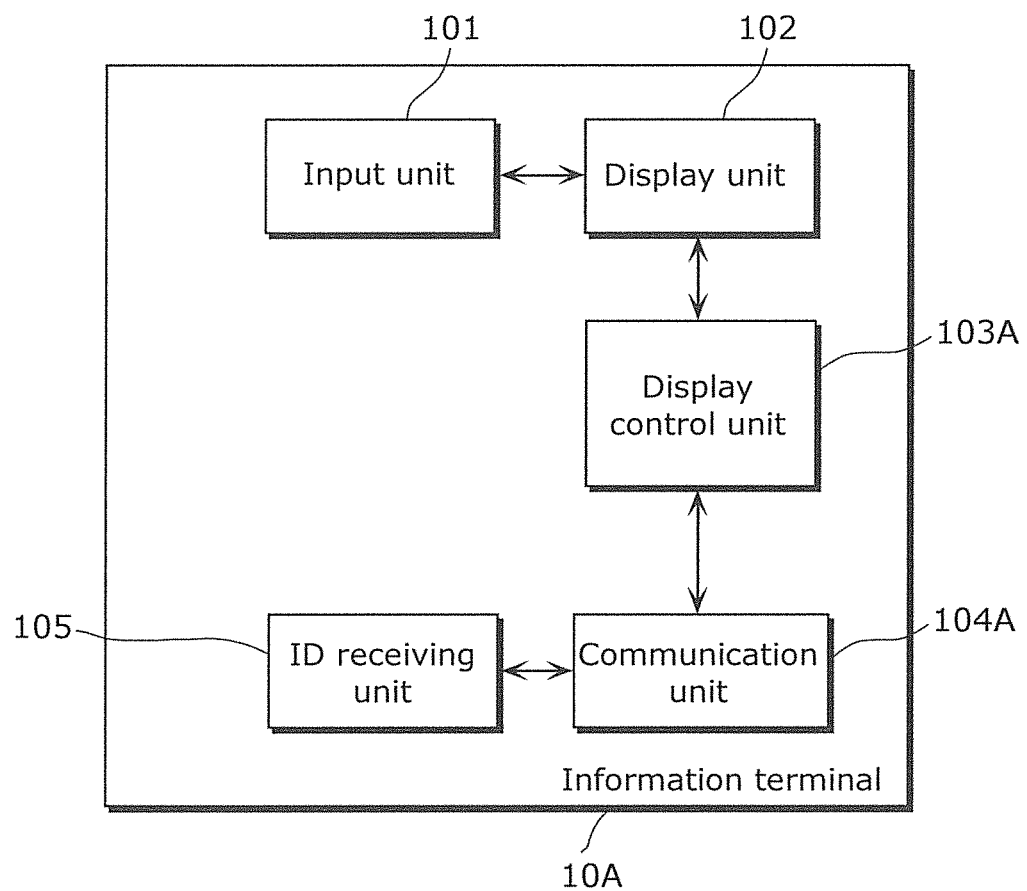
FIG. 13A is a block diagram showing an exemplary configuration of an information terminal according to Embodiment 2.

FIG. 13A is a block diagram showing an exemplary configuration of an information terminal according to Embodiment 2. It is to be noted that the same reference signs are assigned to the same structural elements as those in FIG. 3, and descriptions thereof are omitted.

An information terminal 10A shown in FIG. 13A differs from the information terminal 10 according to Embodiment 1 in the lack of the application information management unit 106 and in functions of a display control unit 103A and a communication unit 104A.

The display control unit 103A obtains related information received from a server 40A, and transmits the obtained related information to the display unit 102.

It is to be noted that, as with Embodiment 1, the display control unit 103A may receive event information items displayed on the display 20.

The communication unit 104A communicates with the server 40A via the network 30. Specifically, the communication unit 104A transmits ID information obtained from the display 20 and user information received by the input unit 101, to the server 40A. The communication unit 104A receives, from the server 40A, related information that is information related to service application information, and transmits the related information to the display control unit 103A.

As stated above, even when not selecting a desired area of the screen of the display 20 such as a digital signage, a user using the information terminal 10A can obtain the information desired by the user from the display 20 without taking much time, and cause the information terminal 10A to display the information. In other words, the information terminal 10A is capable of: obtaining, from the event information items, related information about a service applied for by the user, through visible light communication with the display 20, which displays the event information items, by the information terminal 10A being held toward the screen of the display 20; and displaying the related information on the display unit 102.

2.2 Configuration of Server 40A

Figure 13B:
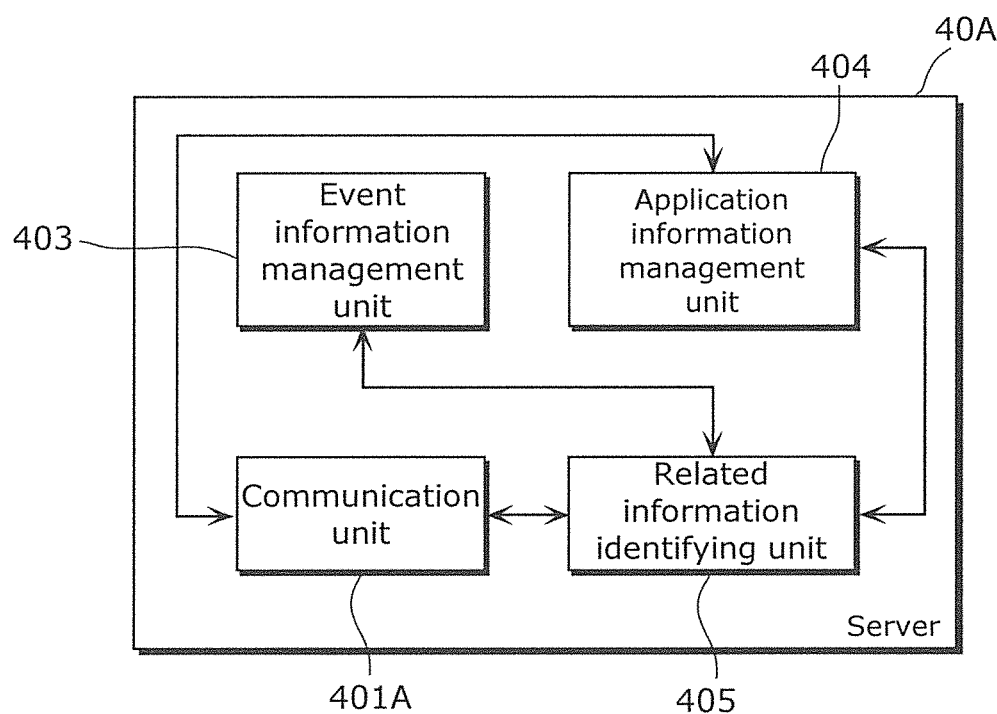
FIG. 13B is a block diagram showing an exemplary configuration of a server according to Embodiment 2.

FIG. 13B is a block diagram showing an exemplary configuration of a server according to Embodiment 2. It is to be noted that the same reference signs are assigned to the same structural elements as those in FIG. 6, and descriptions thereof are omitted.

The server 40A shown in FIG. 13B differs from the server 40 according to Embodiment 1 in an application information management unit 404 and a related information identifying unit 405 and in a function of a communication unit 401A.

The application information management unit 404 manages user information and service application information in association with each other. In this embodiment, the application information management unit 404 stores user information about the user inputted with the information terminal 10A and service application information indicating the contents of a service applied for by the user, and manages the user information and the service application information in association with each other.

The related information identifying unit 405 obtains the service application information of the user transmitted by the information terminal 10A and stored (managed) by the application information management unit 404. The related information identifying unit 405 identifies, as information items associated with ID information transmitted by the information terminal 10A (ID information transmitted by the display 20), event information items displayed on the display 20. When the identified event information items include related information that is information related to a service application, the related information identifying unit 405 identifies and transmits the related information to the information terminal 10A via the communication unit 401A.

Here, the related information identifying unit 405 compares the service application information stored in the application information management unit 404 and the identified event information items, determines that the event information items include the related information when the event information items include information suggesting the service application information, and identifies the related information.

In this way, the related information identifying unit 405 identifies the related information based on the ID information and the service application information that are obtained.

The communication unit 401A communicates with the information terminal 10A via the network 30. Specifically, the communication unit 401A receives the ID information and the service application information transmitted by the information terminal 10A. The communication unit 401A transmits, to the information terminal 10A, the related information thus identified based on the ID information and the service application information by the related information identifying unit 405.

As stated above, the server 40A identifies the related information based on the ID information transmitted by the information terminal 10A and the service application information managed by the application information management unit 404, and transmits the identified related information to the information terminal 10A.

2.3 Operations of Display System

Next, operations of a display system in this embodiment are described.

Figure 14:
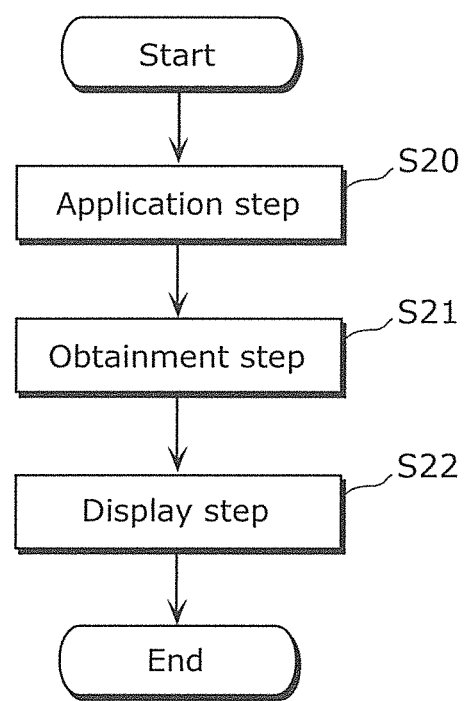
FIG. 14 is a flow chart showing a processing flow of a display method performed by a display system according to Embodiment 2.

FIG. 14 is a flow chart showing a processing flow of a display method performed by a display system according to Embodiment 2.

First, a user performs an application step using the information terminal 10A, for instance (S20). More specifically, the user performs a service application for a specific event (an application for at least one of services), using the information terminal 10A.

In this embodiment, S20 includes a storage step for storing, into the server 40A, service application information indicating the contents of, among services, a service of a specific event which is applied for by the user.

Next, the information terminal 10A and the server 40A perform an obtainment step (S21). More specifically, by the user holding the information terminal 10A toward the screen of the display 20 that displays event information items, the information terminal 10A performs visible light communication with the display 20. Then, the server 40A identifies the event information items and related information and transmits the event information items and the related information to the information terminal 10A. As a result, the information terminal 10A obtains the related information.

Next, the information terminal 10A performs a display step (S22). More specifically, the information terminal 10A displays the related information obtained in S21 on the display unit 102 of the information terminal 10A.

In this embodiment, S21 includes a determination step for comparing the service application information stored in the server 40A in the storage step included in S21 and the event information items obtained in S21, and determining that the event information items include the related information when the event information items include information suggesting the service application information, the determination step being performed by the server 40A.

Next, a more specific processing flow of the display system according to Embodiment 2 is described.

Figure 15:
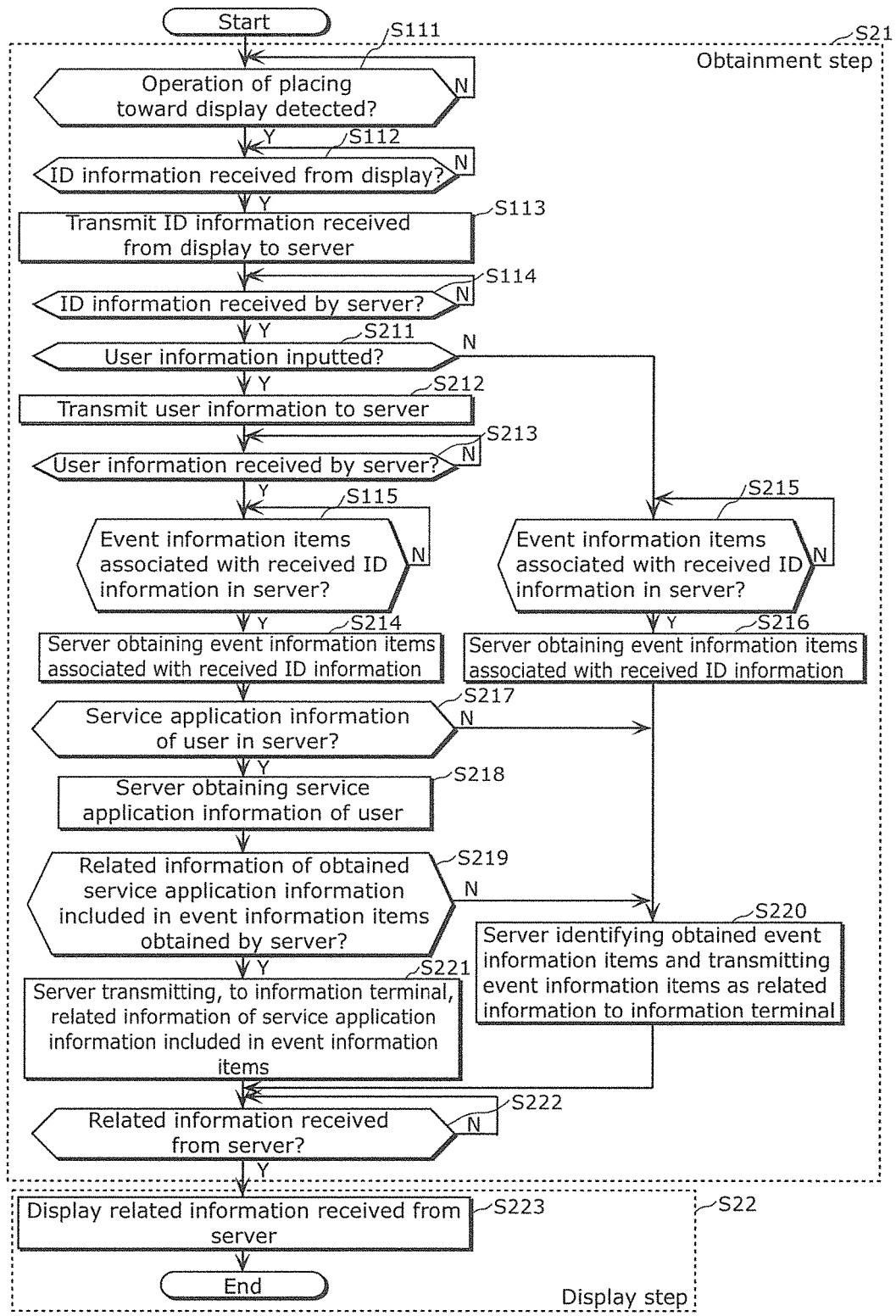
FIG. 15 is a flow chart showing a specific processing flow of the display method according to Embodiment 2.

FIG. 15 is a flow chart showing a specific processing flow of the display method according to Embodiment 2. It is to be noted that the same reference signs are assigned to the same structural elements as those in FIG. 8, and descriptions thereof are omitted.

Here, it is assumed that the application step of S20 has been completed. It is also assumed that, as described for FIG. 7, the user performs an operation of holding the information terminal 10A toward the display 20 to determine whether information related to a service applied for by the user is present by looking at the display 20 as shown in FIG. 2.

When having received ID information in S114 (Y in S114), the server 40A determines whether user information is in the server 40A (S211).

Next, when the user information is not in the server 40A (Y in S211), the server 40A causes the information terminal 10A to transmit the user information (S212).

Next, it is determined whether the server 40A has received the user information (S213), and when it is determined that the server 40A has received the user information (Y in S213), the flow proceeds to S115. In S115, as stated above, the server 40A determines whether the event information items associated with the ID information received from the information terminal WA is in the server 40A.

Next, when the event information items associated with the ID information are in the server 40A (Y in S115), the server 40A obtains the event information items associated with the ID information (S214) and determines whether service application information of the user is in the server 40A (S217).

Next, when having determined that the service application information of the user is in the server 40A (Y in S217), the server 40A determines whether the event information items include related information of the service application information (S219).

Next, when having determined that the event information items include the related information (Y in S219), the server 40A identifies and transmits the related information to the information terminal 10A (S221).

Next, when having received the related information from the server 40A (Y in S222), the information terminal 10A displays the received related information on the display unit 102 (S223).

It is to be noted that when the user information is in the server 40A in S211, the flow proceeds to S215. As with S115, the server 40A determines in S215 whether the event information items associated with the ID information received from the information terminal 10A are in the server 40A. Next, when the event information items associated with the ID information are in the server 40A (Y in S215), the server 40A obtains the event information items associated with the ID information (S216) and transmits, as related information, the obtained event information items to the information terminal 10A (S224). Then, the flow proceeds to the process of S222.

2.4 Effect

As described above, according to Embodiment 2, the server 40A manages the service application information and identifies the related information. By performing the operation of holding the information terminal 10A toward the screen of the display 20, the user can cause the display unit 102 of the information terminal 10A to display the information related to the contents (the service application information) of the service applied for by the user among the event information items.

With this, even when not selecting a desired area of the screen of the display 20 such as a digital signage, the user using the information terminal 10A can obtain the information desired by the user from the display 20 without taking much time, and cause the information terminal 10A to display the information.

(Embodiment 3)

Embodiment 2 has described the case where the single server 40A includes the application information management unit 404 and manages the user information and the service application information in association with each other, but the present invention is not limited to this. Embodiment 3 describes a case where two servers each include an application information management unit, one of the two servers (a first server 40B) identifies related information of a service applied for by a user, and the other of the two servers (a second server 41) manages user information and service application information in association with each other.

The following mainly describes differences from Embodiment 2.

3.1 Configuration of Information Terminal 10B

Figure 16:
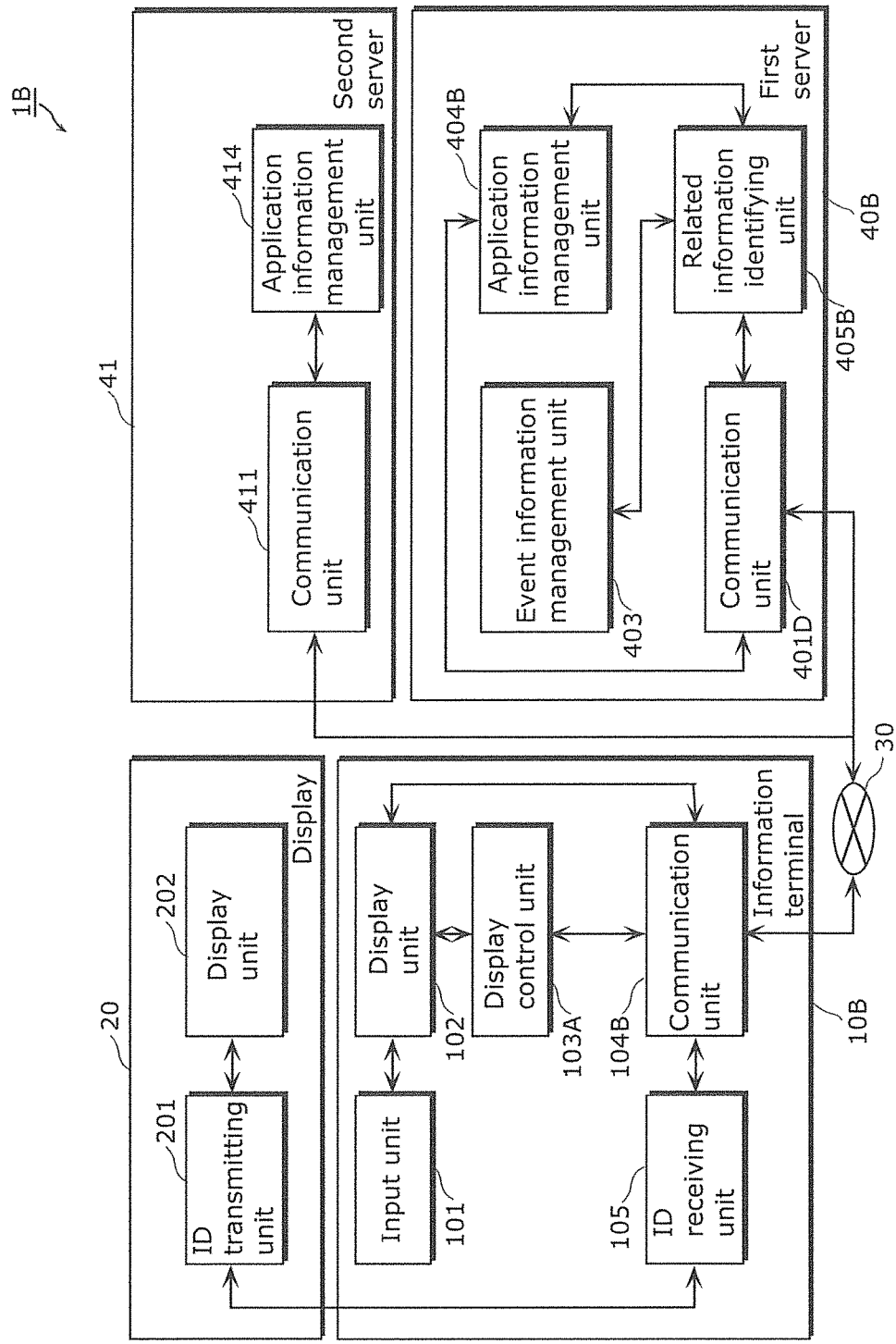
FIG. 16 is a block diagram showing an exemplary configuration of a display system 1B according to Embodiment 3.

FIG. 16 is a block diagram showing an exemplary configuration of a display system 1B according to Embodiment 3. It is to be noted that the same reference signs are assigned to the same structural elements as those in FIGS. 5, 13A, and 13B, and descriptions thereof are omitted.

An information terminal 10B shown in FIG. 16 differs from the information terminal 10A according to Embodiment 2 in part of functions of a communication unit 104B.

The communication unit 104B communicates with the first server 40B and the second server 41 via the network 30. Specifically, the communication unit 104B transmits ID information obtained from the display 20 to the first server 40B, and user information received by the input unit 101 to the second server 41. Moreover, the communication unit 104B transmits information indicating the contents of a service application for a specific event (an application for at least one of services) to the second server 41. The communication unit 104B receives, from the first server 40B, related information that is information related to the contents of the service application (service application information), and transmits the related information to the display control unit 103A.

3.2 Configuration of First Server 40B

The first server 40B shown in FIG. 16 corresponds to the server 40A according to Embodiment 2, but differs from the server 40A in part of functions of a communication unit 401B, an application information management unit 404B, and a related information identifying unit 405B.

The application information management unit 404B manages user information and service application information obtained from the second server 41, in association with each other. More specifically, the first server 40B receives the service application information and the user information transmitted by the second server 41 and stored in an application information management unit 414 of the second server 41, and stores the service application information into the application information management unit 404B.

The related information identifying unit 405B identifies, as information items associated with ID information transmitted by the information terminal 10A (ID information transmitted by the display 20), event information items displayed on the display 20. When the identified event information items include related information that is information related to the service application information stored in the application information management unit 404B, the related information identifying unit 405B identifies the related information based on the service application information, and transmits the related information to the information terminal 10B via the communication unit 401B.

Here, the related information identifying unit 405B compares the service application information stored in the application information management unit 404B and the identified event information items, determines that the event information items include the related information when the event information items include information suggesting the service application information, and identifies the related information.

In this way, the related information identifying unit 405B identifies the related information based on the obtained ID information and the service application information obtained from the second server 41.

The communication unit 401B communicates with the information terminal 10B and the second server 41 via the network 30. Specifically, the communication unit 401B receives the ID information transmitted by the information terminal 10B, and the user information and the service application information transmitted by the second server 41. Moreover, the communication unit 401B transmits, to the information terminal 10B, the related information thus identified based on the ID information and the service application information by the related information identifying unit 405B.

3.3 Configuration of Second Server 41

The second server 41 shown in FIG. 16 includes a communication unit 411 and the application information management unit 414.

The application information management unit 414 manages user information and service application information in association with each other. More specifically, the application information management unit 414 stores user information transmitted by the information terminal 10B, and service application information indicating the contents of a service applied for by the user using the information terminal 10B or the like, and manages the user information and the service application information in association with each other. Moreover, the application information management unit 414 transmits the service application information and the user information stored therein, to the first server 40B. With this, the first server 40B stores the service application information and the user information into the application information management unit 404B, and manages the service application information and the user information in association with each other.

The communication unit 411 communicates with the information terminal 10B and the first server 40B via the network 30. Specifically, the communication unit 411 receives at least the user information transmitted by the information terminal 10B, and transmits the user information and the service application information managed in association with each other by the application information management unit 414, to the first server 40B. Moreover, the communication unit 411 receives the service application information transmitted by the information terminal 10B.

3.4 Operations of Display System

Next, operations of the display system 1B in this embodiment are described.

Figure 17:
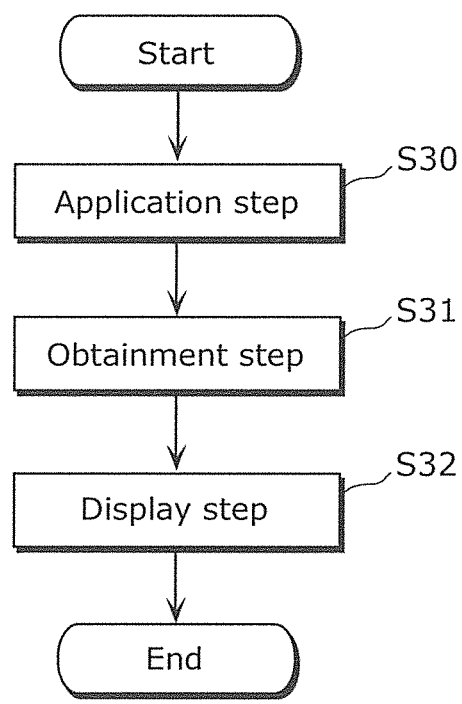
FIG. 17 is a flow chart showing a processing flow of a display method performed by the display system according to Embodiment 3.

FIG. 17 is a flow chart showing a processing flow of a display method performed by a display system according to Embodiment 3.

First, a user performs an application step using the information terminal 10B, for instance (S30). More specifically, the user performs a service application for a specific event (an application for at least one of services), using the information terminal 10B, for example.

In this embodiment, S30 includes a storage step for storing, into the second server 41, service application information indicating the contents of, among services, a service of a specific event (a service application) which is applied for by the user.

Next, the information terminal 10B, the first server 40B, and the second server 41 perform an obtainment step (S31). More specifically, by the user holding the information terminal 10B toward the screen of the display 20 that displays event information items, the information terminal 10B performs visible light communication with the display 20. Then, the first server 40B identifies related information based on ID information transmitted by the information terminal 10B and service application information transmitted by the second server 41, and transmits the related information to the information terminal 10B. As a result, the information terminal 10B obtains the related information.

Next, the information terminal 10B performs a display step (S32). More specifically, the information terminal 10B displays the related information obtained in S31 on the display unit 102 of the information terminal 10B.

In this embodiment, S31 includes a determination step for comparing the service application information stored in the second server 41 in the storage step included in S31 and the event information items obtained in S31, and determining that the event information items include the related information when the event information items include information suggesting the service application information, the determination step being performed by the first server 40B.

Next, a more specific processing flow of the display system according to Embodiment 3 is described.

Figure 18:
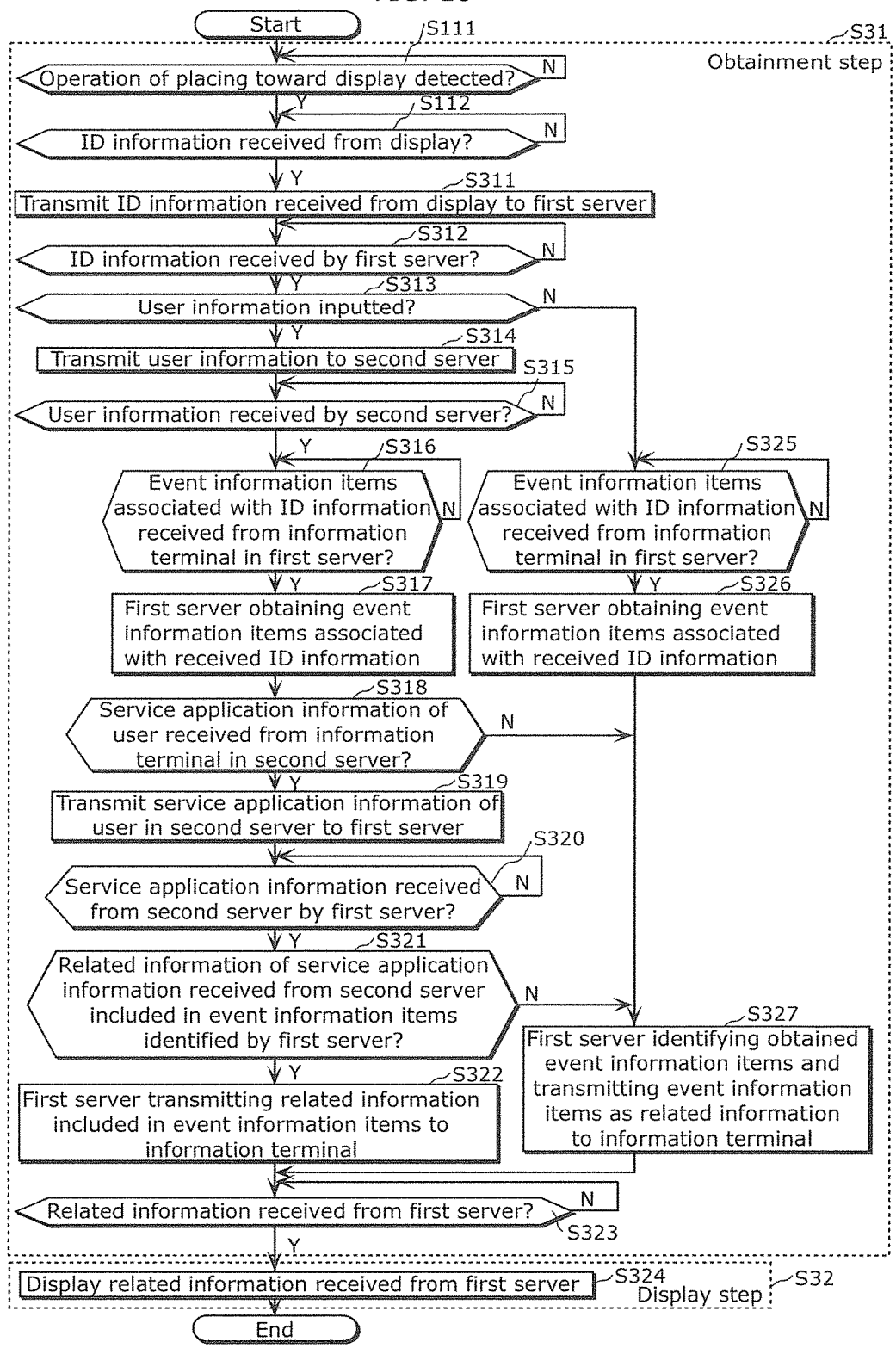
FIG. 18 is a flow chart showing a specific processing flow of the display method according to Embodiment 3.

FIG. 18 is a flow chart showing a specific processing flow of the display method according to Embodiment 3. It is to be noted that the same reference signs are assigned to the same structural elements as those in FIG. 15, and descriptions thereof are omitted.

Here, it is assumed that the application step of S30 has been completed. It is also assumed that the user performs an operation of holding the information terminal 10B toward the display 20 to determine whether information related to a service applied for by the user is present by looking at the display 20 as shown in FIG. 2.

Assuming that the server 40A is the first server 40B, S311 and S312 are the same as S113 and S114 shown in FIG. 15 respectively. Thus, descriptions of S311 and S312 are omitted. Assuming that the server 40A is the second server 41, S314 and S315 are the same as S111 and S213 shown in FIG. 15 respectively. Thus, descriptions of S314 and S315 are omitted. Assuming that the server 40A is the first server 40B, S316 and S317 are the same as S115 and S214 shown in FIG. 15 respectively. Thus, descriptions of S316 and S317 are omitted. Likewise, assuming that the server 40A is the second server 41, S318 is the same as S217 shown in FIG. 15. Thus, a description of S318 is omitted.

When it has been determined in S318 that the service application information of the user is in the second server 41 (Y in S318), the second server 41 transmits the service application information to the first server 40B (S319).

Next, when the first server 40B has received the service application information from the second server 41 (Y in S320), the server 40A determines whether event information items include related information of the service application information (S321).

It is to be noted that assuming that the server 40A is the first server 40B, the subsequent processes, that is, S322 to S327 are the same as S221 to S223, S215, S216, and S220 shown in FIG. 15 respectively. Thus, descriptions thereof are omitted.

3.5 Effect

As described above, according to Embodiment 3, the second server 41 manages the service application information. The second server 41 transmits the service application information to the first server 40B, and the first server 40B identifies the related information. By performing the operation of holding the information terminal 10B toward the screen of the display 20, the user can cause the display unit 102 of the information terminal 10B to display the related information of the service applied for by the user among the event information items.

With this, even when not selecting a desired area of the screen of the display 20 such as a digital signage, the user using the information terminal 10B can obtain the information desired by the user from the display 20 without taking much time, and cause the information terminal 10B to display the information.

(Embodiment 4)

Embodiment 3 has described the case where the one of the two servers (the first server) identifies the related information of the service applied for by the user, but the present invention is not limited to this. As with Embodiment 1, an information terminal may identify related information of a service applied for by a user. Regarding this case, the following mainly describes differences from Embodiment 3.

4.1 Configuration of Information Terminal 10C

Figure 19:
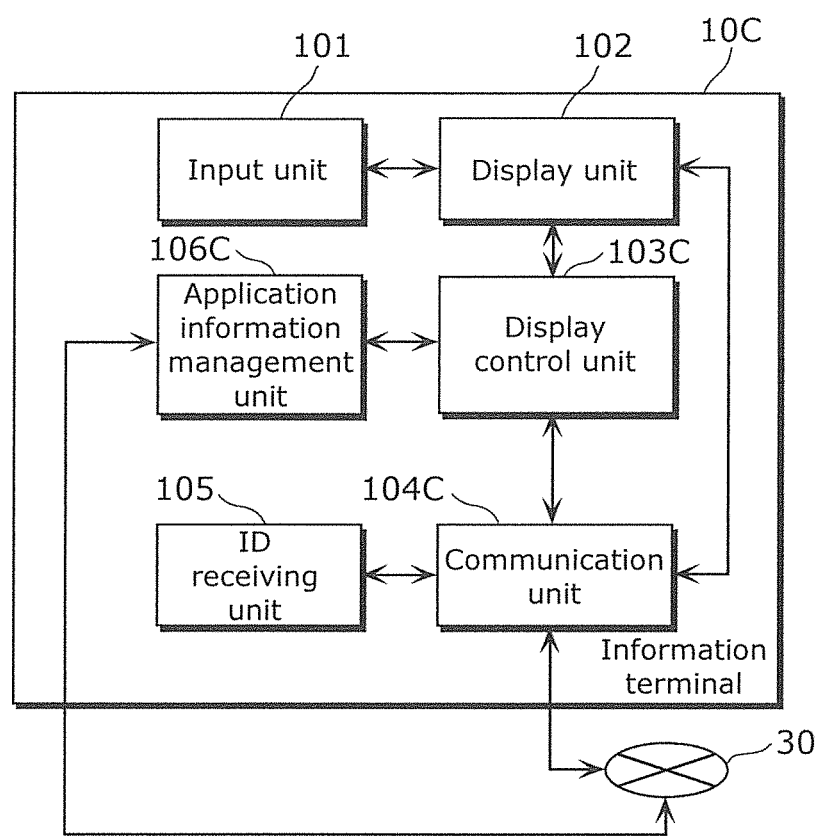
FIG. 19 is a block diagram showing an exemplary configuration of an information terminal according to Embodiment 4.

FIG. 19 is a block diagram showing an exemplary configuration of an information terminal according to Embodiment 4. It is to be noted that the same reference signs are assigned to the same structural elements as those in FIGS. 3 and 13A, and descriptions thereof are omitted.

An information terminal 10C shown in FIG. 19 differs from the information terminal 10B according to Embodiment 3 in the addition of an application information management unit 106C and part of functions of a display control unit 103C and a communication unit 104C.

The communication unit 104C communicates with a first server 40C and the second server 41 via the network 30. Specifically, the communication unit 104C transmits ID information obtained from the display 20 to the first server 40C, and user information received by the input unit 101 to the second server 41. Moreover, the communication unit 104C transmits a service application for a specific event (an application for at least one of services) to the second server 41.

The communication unit 104C receives transmission event information items associated with the ID information from the first server 40C, and transmits the transmission event information items to the display control unit 103C.

When the transmission event information items received from the first server 40C (event information items displayed on the display 20) include related information of the service applied for by the user, the display control unit 103C transmits the related information to the display unit 102 and causes the display unit 102 to display the related information.

Here, the display control unit 103C compares service application information stored in the application information management unit 106C and the obtained transmission event information items, and determines that the transmission event information items include the related information when the transmission event information items include information suggesting the service application information.

The application information management unit 106C manages user information and service application information in association with each other. In this embodiment, the application information management unit 106C stores user information received from the second server 41 and service application information, and manages the user information and the service application information in association with each other.

4.2 Configurations of First Server 40C and Second Server 41

Figure 20:
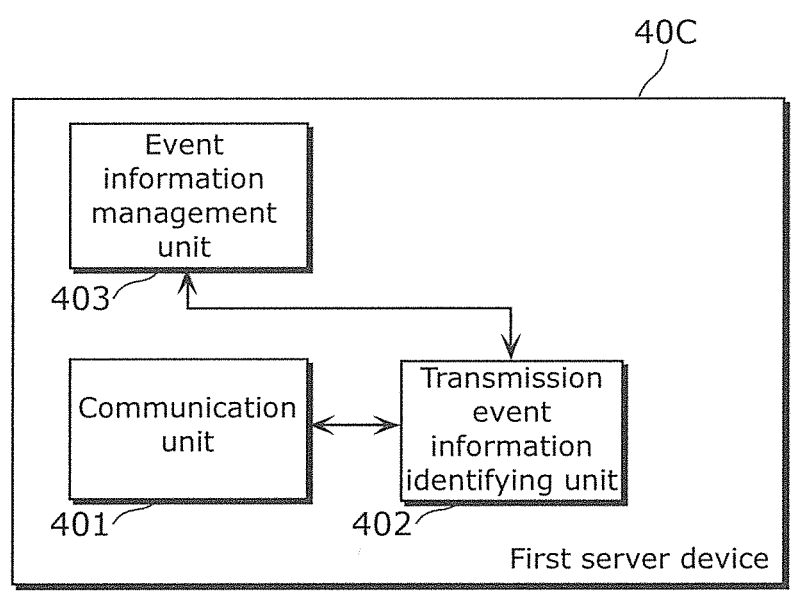
FIG. 20 is a block diagram showing an exemplary configuration of a server according to Embodiment 4.

FIG. 20 is a block diagram showing an exemplary configuration of a first server according to Embodiment 4. It is to be noted that the same reference signs are assigned to the same structural elements as those in FIGS. 6 and 16, and descriptions thereof are omitted.

The first server 40C shown in FIG. 20 differs from the first server 40B according to Embodiment 3 in the deletion of the application information management unit. For this reason, the first server 40C corresponds to the server 40 according to Embodiment 1. In other words, the first server 40C includes the communication unit 401, the transmission event information identifying unit 402, and the event information management unit 403.

Moreover, the second server 41 is the same as the one in Embodiment 3, a description thereof is omitted.

4.3 Operations of Display System

Next, operations of a display system in this embodiment are described.

Figure 21:
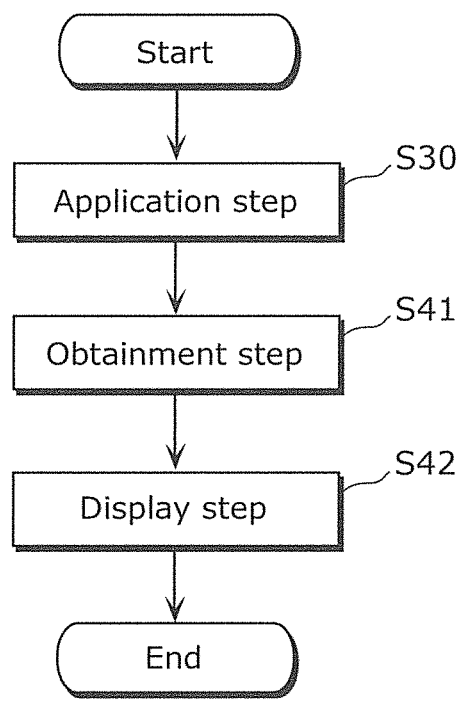
FIG. 21 is a flow chart showing a processing flow of a display method performed by a display system according to Embodiment 4.

FIG. 21 is a flow chart showing a processing flow of a display method performed by the display system according to Embodiment 4. It is to be noted that the same reference signs are assigned to the same structural elements as those in FIG. 17, and descriptions thereof are omitted.

First, a user performs an application step using the information terminal 10B, for instance (S30).

Next, the information terminal 10C, the first server 40C, and the second server 41 perform an obtainment step (S41). More specifically, by the user holding the information terminal 10C toward the screen of the display 20 that displays event information items, the information terminal 10C performs visible light communication with the display 20. Then, the first server 40C identifies transmission event information items based on ID information transmitted by the information terminal 10C, and transmits the transmission event information items to the information terminal 10C. The second server 41 transmits service application information and user information that are managed therein, to the information terminal 10C. With this, the information terminal 10C obtains the transmission event information items, the service application information, and the user information.

Next, the information terminal 10C performs a display step (S42). More specifically, when event information items obtained in S41 include related information that is information related to service application information (contents of at least one of services which has been applied for by the user), the information terminal 10C displays the related information on the display unit 102 thereof.

In this embodiment, S41 includes a storage step for transmitting, to the information terminal 10C, service application information stored in the second server 41 in a storage step included in S30, and storing the service application information into the information terminal 10C.

Moreover, 541 includes a determination step for comparing the stored service application information and the obtained event information items, and determining that the event information items include the related information when the event information items include information suggesting the service application information, the determination step being performed by the information terminal 10C.

Next, a more specific processing flow of the display system according to Embodiment 4 is described.

Figure 22:
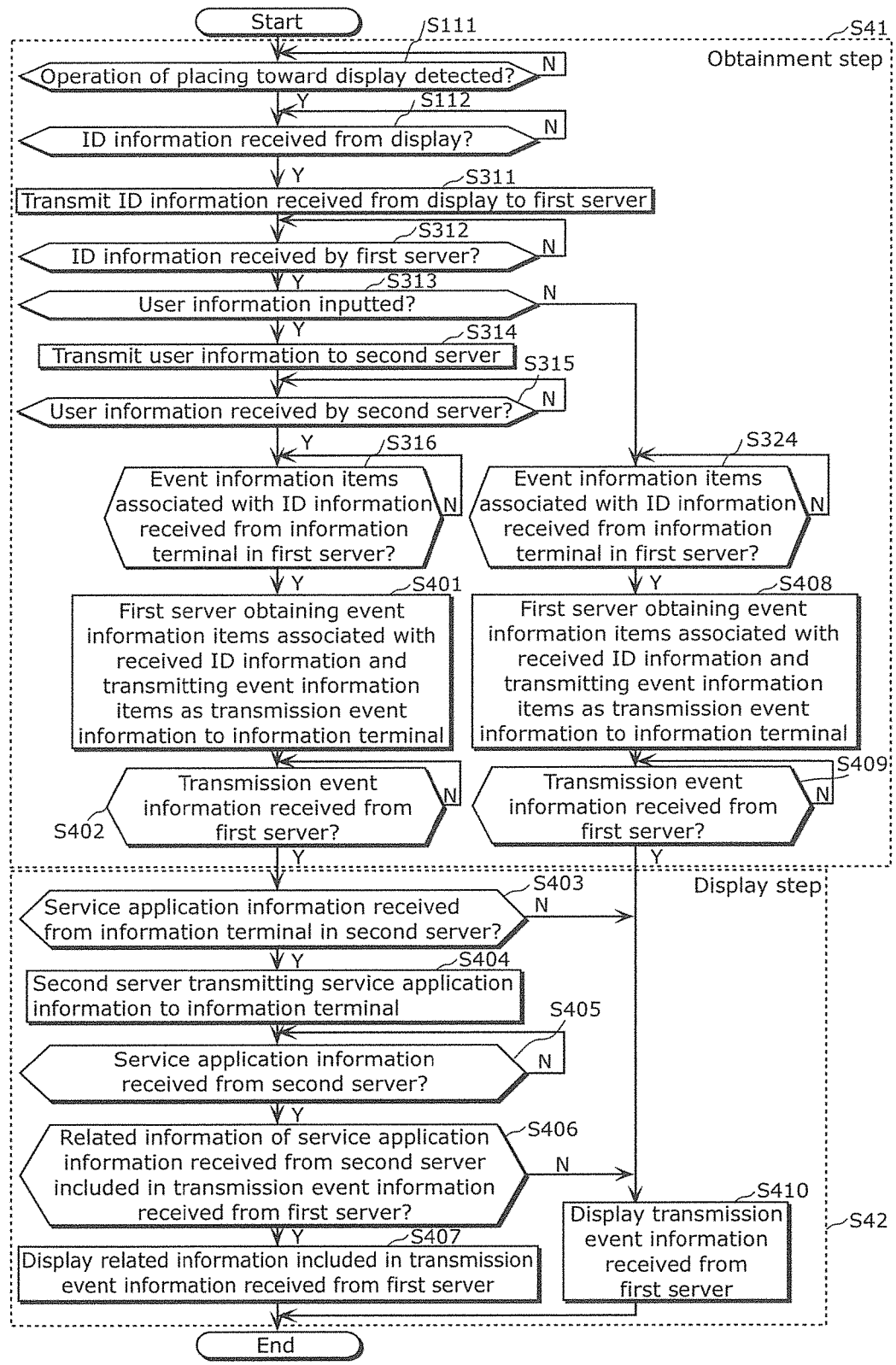
FIG. 22 is a flow chart showing a specific processing flow of the display method according to Embodiment 4.

FIG. 22 is a flow chart showing a specific processing flow of the display method according to Embodiment 4. It is to be noted that the same reference signs are assigned to the same structural elements as those in FIGS. 8 and 18, and descriptions thereof are omitted.

Here, it is assumed that the application step of S30 has been completed. It is also assumed that the user performs an operation of holding the information terminal 10C toward the display 20 to determine whether information related to a service applied for by the user is present by looking at the display 20 as shown in FIG. 2. Moreover, assuming that the server 40 is the first server 40C, S401 and S402, and S408 and S409 are the same as S116 and S117 shown in FIG. 8. Thus, descriptions thereof are omitted.

When having received the transmission event information items from the first server 40C in S402 (Y in S402), the information terminal 10C determines whether service application information of the user is in the second server 41 (S403).

Next, when the service application information is in the second server 41 (Y in S403), the second server 41 transmits the service application information to the information terminal 10C (S404).

Next, when having received the service application information from the second server 41 (Y in S405), the information terminal 10C determines whether the transmission event information items received from the first server 40C include related information of the service application information received from the second server 41 (S406).

Next, when the transmission event information items include the related information of the service application information (Y in S406), the information terminal 10C displays the related information on the display unit 102 (S407).

It is to be noted that when the service application information of the user is not in the second server 41 in S403 (N in S403), and the transmission event information items do not include the related information of the service application information in S406 (N in S406), the information terminal 10C directly displays on the display unit 102 the transmission event information items received from the first server 40C (S410).

4.4 Effect

As described above, according to Embodiment 4, the second server 41 manages the service application information. The second server 41 transmits the service application information to the information terminal 10C. In contrast, the first server 40C transmits to the information terminal 10C the transmission event information items associated with the ID information received from the information terminal 10C. The information terminal 10C identifies the related information based on the service application information and the transmission event information items, and displays the related information.

By performing the operation of holding the information terminal 10C toward the screen of the display 20, the user can cause the display unit 102 of the information terminal 10C to display the related information related to the contents (the service application information) of the service applied for by the user among the event information items.

As stated above, even when not selecting a desired area of the screen of the display 20 such as a digital signage, the user using the information terminal 10C can obtain the information desired by the user from the display 20 without taking much time, and cause the information terminal 10C to display the information.

(Embodiment 5)

Embodiments 1 to 4 have described the case where when the service application information indicating the contents of the service applied for by the user is present, and the event information items are displayed on the display 20, the information terminal is caused to display the related information of the service application information by performing the operation of holding the information terminal for visible light communication. The present invention, however, is not limited to this. In stead of the related information of the service application information, product information about a product preferred by a user may be displayed.

Hereinafter, a display system 1D according to Embodiment 5 is described with reference to the drawings.

5.1 Entire Configuration of Display System 1D

Figure 23:
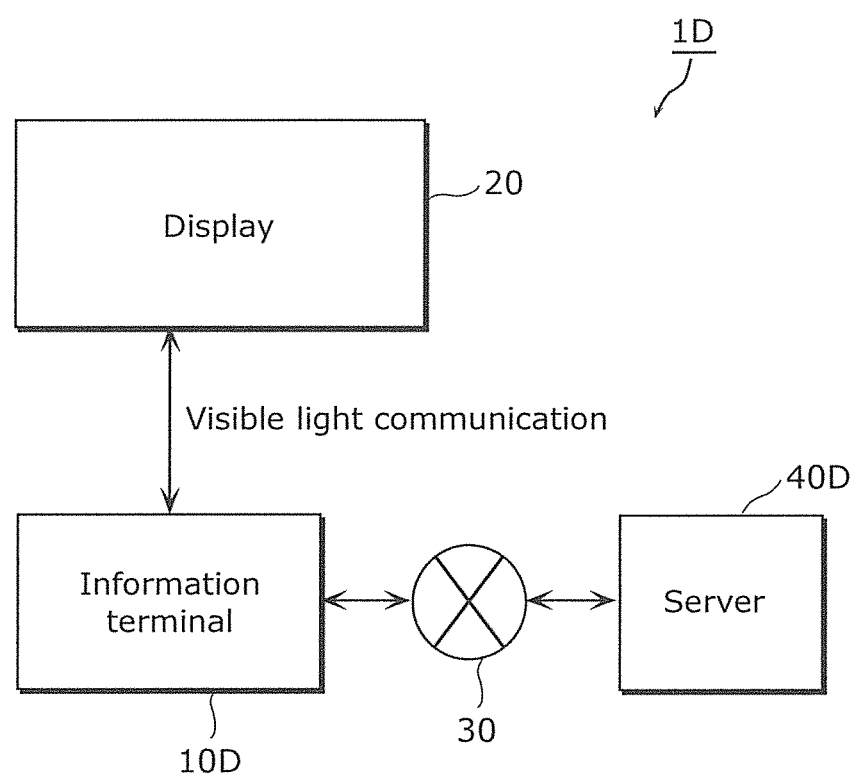
FIG. 23 is a diagram showing an exemplary entire configuration of a display system according to Embodiment 5.

FIG. 23 is a diagram showing an exemplary entire configuration of a display system according to Embodiment 5. It is to be noted that the same reference signs are assigned to the same structural elements as those in FIG. 1, and descriptions thereof are omitted.

The display system 1D shown in FIG. 23 includes an information terminal 10D, the display 20, and a server 40D. The information terminal 10D and the server 40D are connected via the network 30.

Here, as with the information terminal 10, the information terminal 10D is a portable device such as a cellular phone, a smart phone, and a tablet.

5.2 Use Situation of Display System 1D

Figure 24:
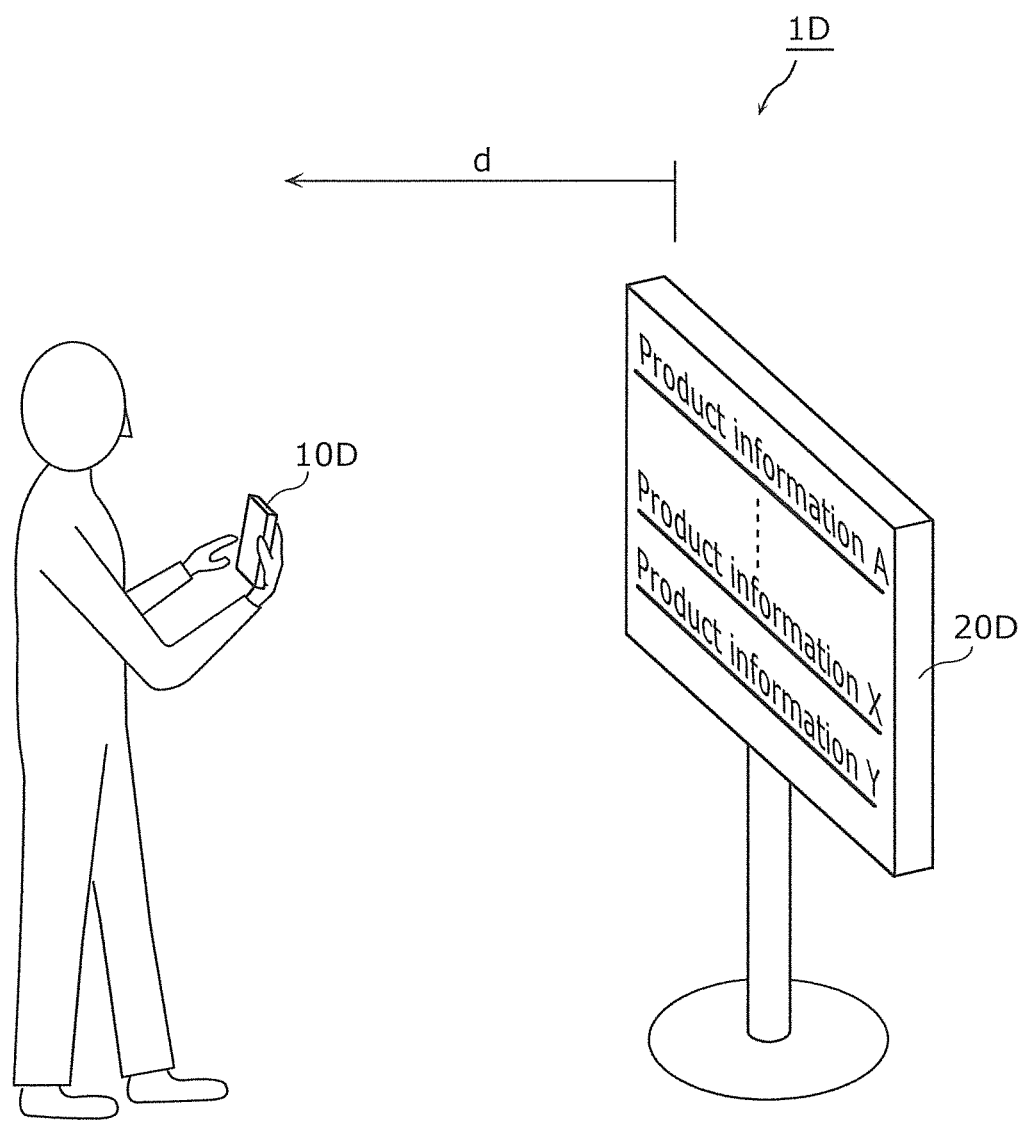
FIG. 24 is a diagram showing an exemplary use situation of the display system according to Embodiment 5.

FIG. 24 is a diagram showing a use situation of a display system according to Embodiment 5.

Just like Embodiments 1 to 4, as shown in FIG. 24, the information terminal 10D is caused to perform visible light communication with the display 20 that displays product information items, by the user at a certain distant (a distance d in the figure) from the display 20 performing an operation of holding the information terminal 10D toward the screen of the display 20, and the display unit 102 of the information terminal 10D is caused to display the product information items. As will hereinafter be described in detail, in this embodiment, the information terminal 10D obtains product information items and displays on the display unit 102 a product information item extracted based on attribute information about the user.

Here, examples of the product information item include a product name, a price, stock information, and a target age and gender for a product. Examples of the attribute information about the user include an age, a gender, a purchase history, and a preference specification of the user.

5.3 Configuration of Information Terminal 10D

Figure 25:
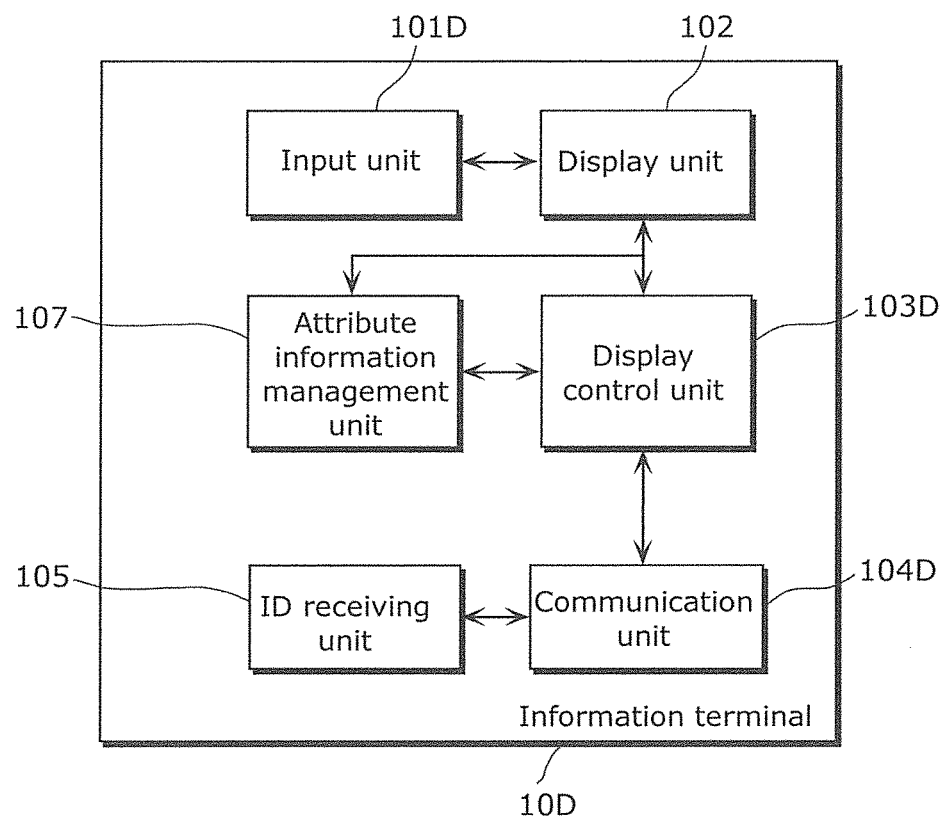
FIG. 25 is a block diagram showing an exemplary configuration of an information terminal according to Embodiment 5.

FIG. 25 is a block diagram showing an exemplary configuration of an information terminal according to Embodiment 5. It is to be noted that the same reference signs are assigned to the same structural elements as those in FIG. 3, and descriptions thereof are omitted.

The information terminal 10D shown in FIG. 25 includes an input unit 101D, the display unit 102, a display control unit 103D, a communication unit 104D, the ID receiving unit 105, and an attribute information management unit 107. The information terminal 10D differs from the information terminal 10 according to Embodiment 1 in the addition of the attribute information management unit 107 instead of the application information management unit 106 and in part of functions of the input unit 101D, the display control unit 103D, and the communication unit 104D.

The input unit 101D detects an operation performed by the user using the information terminal 10D, and receives information or the like inputted by the detected operation. Examples of the operation performed by the user include an operation of inputting user information, an operation of inputting attribute information about a user, an operation of purchasing a product, and an operation of holding toward a display.

The display unit 102 displays a product information item suitable for attribute information about the user. In this embodiment, when product information items (also referred to as transmission product information items) obtained by the display control unit 103 include the product information item suitable for the attribute information about the user, the display unit 102 displays only the product information item.

The attribute information management unit 107 manages user information and attribute information about the user in association with each other.

The display control unit 103D obtains transmission product information items received from the server 40D and attribute information about the user, extracts a product information item (specific product information item)

included in the transmission product information items, and causes the display unit 102 to display the product information item.

More specifically, the display control unit 103D obtains ID information through visible light communication with the display 20, which displays product information items, by the information terminal 10D being held toward the display 20, and transmits the obtained ID information to the server 40D. Then, the display control unit 103D obtains, from the server 40D, the transmission product information items (the product information items displayed on the display 20) as information items associated with the ID information. When the obtained transmission product information items include the product information item (the specific product information item) suitable for the attribute information about the user, the display control unit 103D extracts and transmits the specific product information item to the display unit 102, and causes the display unit 102 to display the specific product information item.

Here, for instance, the display control unit 103D may extract the specific product information item by comparing a user's gender included in the attribute information about the user and gender information included in the transmission product information items or comparing a user's age included in the attribute information about the user and age information included in the transmission product information items. It is to be noted that the attribute information includes at least one of the user's gender and age, and product information includes, in addition to information about a product, at least one of gender information and age information suitable for the product.

Moreover, for example, the display control unit 103D may extract, from the obtained transmission product information items, the specific product information item suitable for the attribute information about the user, using preference characteristics. It is to be noted that the attribute information includes preference characteristics of the user, and a preference specification is assumed to be determined based on a purchase history of the user.

The communication unit 104D communicates with the server 40D via the network 30. Specifically, the communication unit 104D transmits the ID information obtained from the display 20 to the server 40D. Moreover, the communication unit 104D receives, from the server 40D, the transmission product information items associated with the ID information, and transmits the transmission product information items to the display control unit 103.

As stated above, even when not selecting a desired area of the screen of the display 20 such as a digital signage, the user using the information terminal 10D can obtain the information desired by the user from the display 20 without taking much time, and cause the information terminal 10D to display the information. More specifically, the information terminal 10D is capable of: obtaining the transmission product information items through visible light communication with the display 20, which displays the product information items, by the information terminal 10D being held toward the screen of the display 20; extracting, among the transmission product information items, the specific product information item suitable for the attribute information about the user; and displaying the specific product information item on the display unit 102.

5.4 Configuration of Server 40D

Figure 26:
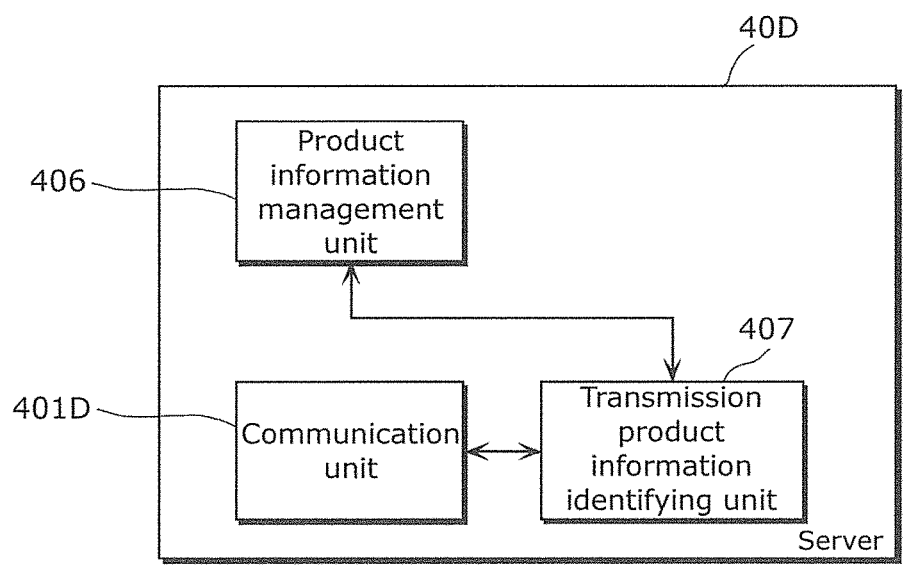
FIG. 26 is a block diagram showing an exemplary configuration of a server according to Embodiment 5.

FIG. 26 is a block diagram showing an exemplary configuration of a server according to Embodiment 5. It is to be noted that the same reference signs are assigned to the same structural elements as those in FIG. 6, and descriptions thereof are omitted.

The server 40D shown in FIG. 26 includes a communication unit 401D, a product information management unit 406, and a transmission product information identifying unit 407.

The communication unit 401D communicates with the information terminal 10D via the network 30. Specifically, the communication unit 401D receives ID information transmitted by the information terminal 10D. Moreover, the communication unit 401D transmits transmission product information items associated with the ID information to the information terminal 10D.

The product information management unit 406 manages ID information and product information items in association with each other. In this embodiment, the product information management unit 406 manages ID information transmitted by the display 20 and product information items displayed on the display 20 in association with each other.

The transmission product information identifying unit 407 identifies and obtains, as transmission product information items, the product information items displayed on the display 20 as information items associated with the ID information transmitted by the information terminal 10D (the ID information transmitted by the display 20). The transmission product information identifying unit 407 transmits the transmission product information items to the information terminal 10D via the communication unit 401D.

As stated above, the server 40D identifies, from the ID information transmitted by the information terminal 10D, the product information items displayed on the display 20, and transmits, as the transmission product information items, the identified product information items to the information terminal 10D.

5.5 Operations of Display System 1D

Next, operations of the display system 1D are described.

Figure 27:
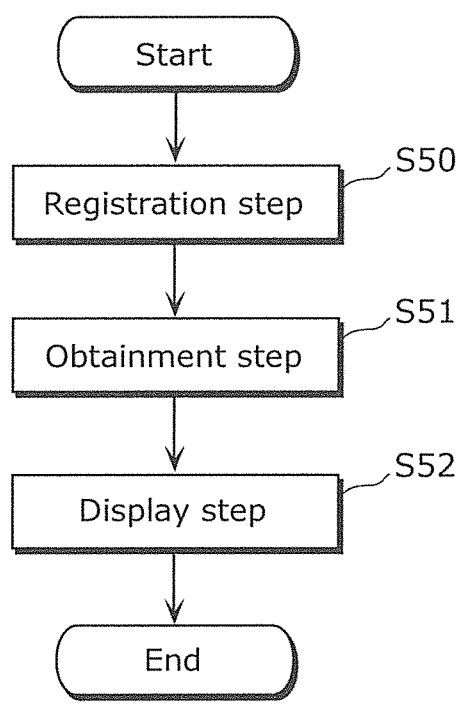
FIG. 27 is a flow chart showing a processing flow of a display method performed by the display system according to Embodiment 5.

FIG. 27 is a flow chart showing a processing flow of a display method performed by the display system according to Embodiment 5.

First, a user performs a registration step using the information terminal 10D (S50). More specifically, the user uses the information terminal 10D to register attribute information about the user with the information terminal 10D.

Next, the information terminal 10D performs an obtainment step (S51). More specifically, by being held toward the screen of the display 20, which displays product information items, the information terminal 10D obtains the product information items through visible light communication with the display 20.

Next, the information terminal 10D performs a display step (S52). More specifically, the information terminal 10D extracts, from the product information items obtained in S51, a product information item (hereinafter also referred to as a specific product information item) suitable for the attribute information about the user registered in S50, and displays the extracted specific product information item on the display unit 102.

Next, a more specific processing flow of the display system according to Embodiment 5 is described.

Figure 28:
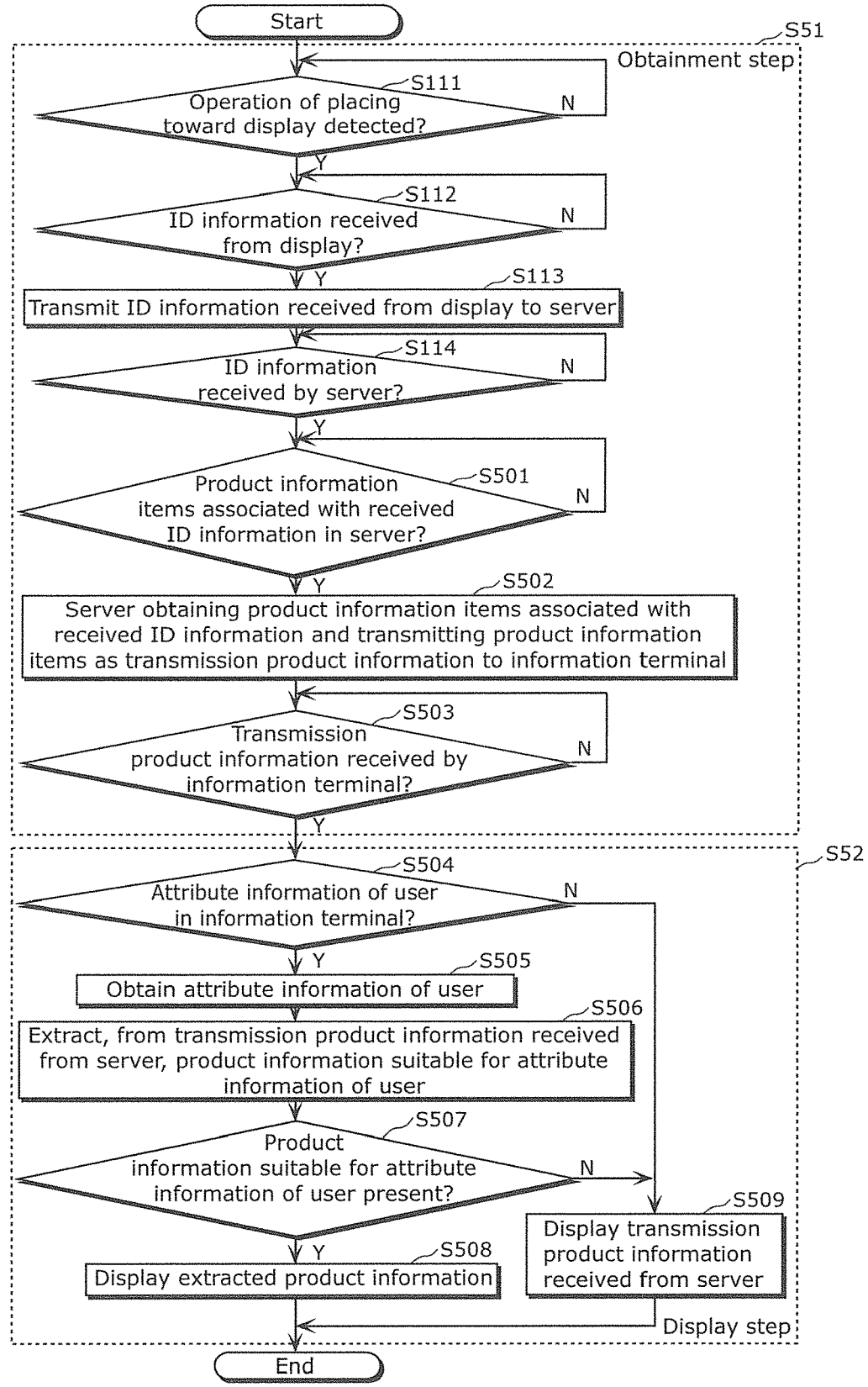
FIG. 28 is a flow chart showing a specific processing flow of the display method according to Embodiment 5.

FIG. 28 is a flow chart showing a specific processing flow of the display method according to Embodiment 5. It is to be noted that the same reference signs are assigned to the same structural elements as those in FIG. 8, and descriptions thereof are omitted.

Here, it is assumed that the registration step of S50 has been completed. It is also assumed that the user starts an application for visible light communication of the information terminal 10D and performs an operation of holding the information terminal 10D toward the display 20 that displays the product information items, to determine whether a product information item suitable for the user is present by looking at the display 20 as shown in FIG. 24.

Assuming that the server 40 and the information terminal 10 are the server 40D and the information terminal 10D respectively, S111 to S114 shown in FIG. 28 are the same as S111 to S114 shown in FIG. 8. Thus, descriptions thereof are omitted.

Moreover, assuming that the server 40 and the information terminal 10 are the server 40D and the information terminal 10D respectively, and the transmission event information items are the transmission product information items, S501 to S503 shown in FIG. 28 are the same as S115 to S117 shown in FIG. 8. Thus, descriptions thereof are omitted.

Next, the information terminal 10D determines whether attribute information about the user is in the information terminal 10D in S504. When the attribute information about the user is in the information terminal 10D (Y in S504), the information terminal 10D obtains the attribute information about the user from the attribute information management unit 107 (S505), and extracts, from the transmission product information items received from the server 40D, a product information item (a specific product information item) suitable for the attribute information (S506).

Next, when the product information item suitable for the attribute information is present (Y in S507), the information terminal 10D displays the extracted product information item (specific product information item) on the display unit 102 (S508).

It is to be noted that when the attribute information about the user is not in the information terminal 10D in S504 (N in S504), and it is determined in S507 that the product information item suitable for the attribute information is not present (N in S507), the information terminal 10D directly displays on the display unit 102 the transmission product information items received from the server 40D (S509).

5.6 Effect

As described above, according to Embodiment 5, the information terminal 10D manages the attribute information about the user and determines the product information item suitable for the attribute information. With this, by holding the information terminal 10D toward the screen of the display 20, the user can cause the display unit 102 of the information terminal 10D to display, among the product information items, the product information item suitable for the attribute information about the user.

As a result, even when not selecting a desired area of the screen of the display 20 such as a digital signage, the user using the information terminal 10D can obtain the information desired by the user from the display 20 without taking much time, and cause the information terminal 10D to display the information.

Here, related information displayed on the display unit 102 is described using an example.

Figure 29:
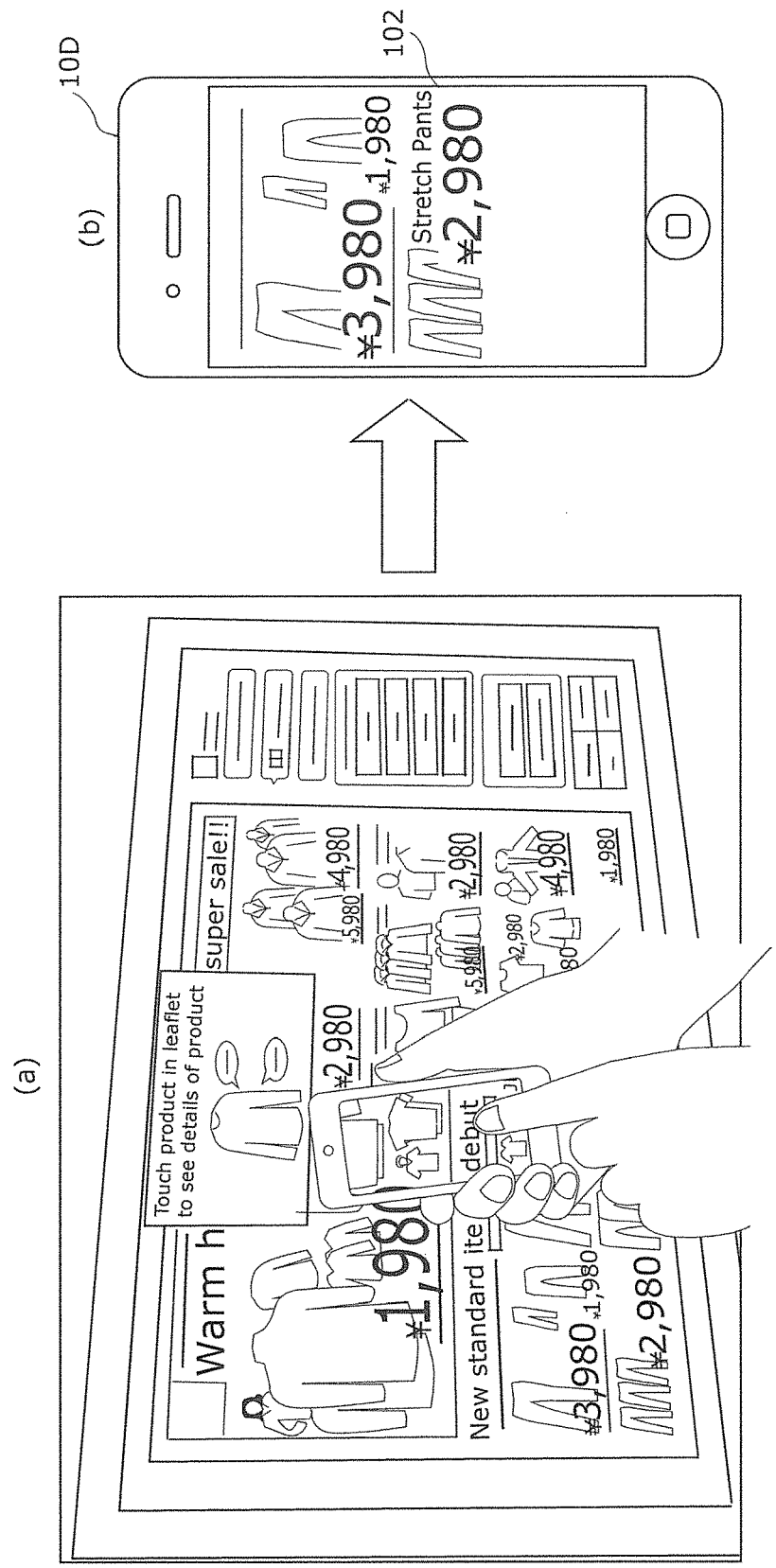
FIG. 29 is a diagram showing exemplary product information displayed on a display unit of the information terminal according to Embodiment 5.
Figure 30:
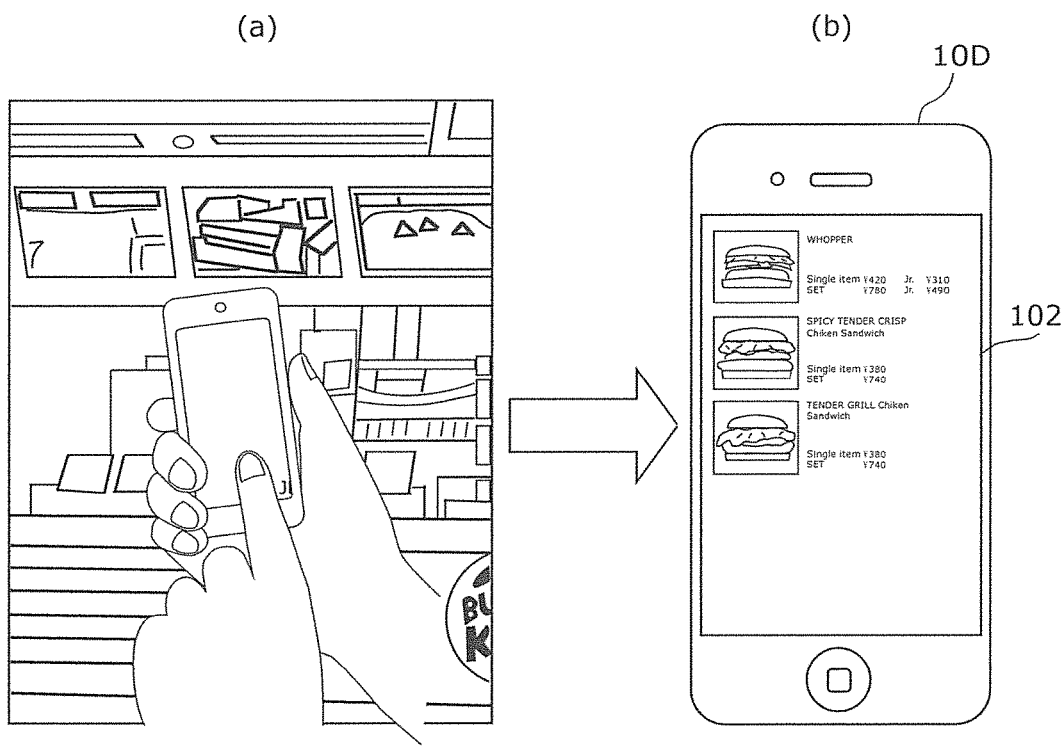
FIG. 30 is a diagram showing exemplary product information displayed on the display unit of the information terminal according to Embodiment 5.

Each of FIGS. 29 and 30 is a diagram showing exemplary related information displayed on a display unit of an information terminal according to Embodiment 5.

For instance, as shown in FIG. 29, a user can determine whether a product information item suitable for the user such as a product suitable for a preference, an age, a gender, or the like of the user is present by looking at the display 20 that displays, as product information items, pictures and prices of products such as clothes like a leaflet. In other words, by holding the information terminal 10D toward the display 20 that displays the pictures and the prices of the products, the user can cause, when the display 20 displays a product information item (a specific product information item) suitable for the attribute information about the user, the display unit 102 of the information terminal 10D to display the specific product information item.

Moreover, for example, as shown in FIG. 30, a user can determine whether a product information item suitable for the user such as a product suitable for a preference, an age, a gender, or the like of the user is present by looking at the display 20 that displays, as product information items, items on a menu at a fast-food restaurant. In other words, by holding the information terminal 10D toward the display 20 that displays the items on the menu, the user can cause, when the display 20 displays a product information item (a specific product information item) suitable for the attribute information about the user, the display unit 102 of the information terminal 10D to display the specific product information item as a recommended item.

Here, the attribute information includes at least one of the user's gender and age, and the product information includes, in addition to information about a product, at least one of gender information and age information suitable for the product. For this reason, the information terminal 10D is capable of extracting and displaying the specific product information item on the display 102 by comparing the user's gender included in the attribute information and the gender information included in the product information item or comparing the user's age included in the attribute information and the age information included in the product information item.

It is to be noted that the attribute information may include preference characteristics of a user. In this case, a determination step for determining preference characteristics based on a purchase history of a user is performed instead of or in addition to the registration step of S50. The information terminal 10D is capable of: extracting, from the obtained product information items (the transmission product information items), the specific product information item suitable for the attribute information about the user, using the preference characteristics determined in the determination step; and displaying the specific product information item on the display unit 102. Here, examples of a specific product suitable for preference characteristics based on a purchase history include a product purchased before, a related product of a product purchased before, and a product excluding a product never purchased before and a related product of the product never purchased before.

(Embodiment 6)

Embodiment 5 has described the case where the information terminal 10D includes the attribute information management unit 107 and manages the user information and the attribute information in association with each other, but the present invention is not limited to this. Embodiment 6 describes a case where a server 40E includes an application information management unit and manages user information and attribute information in association with each other, with reference to FIG. 31 to FIG. 34.

The following mainly describes differences from Embodiment 5.

6.1 Configuration of Information Terminal 10E

Figure 31:
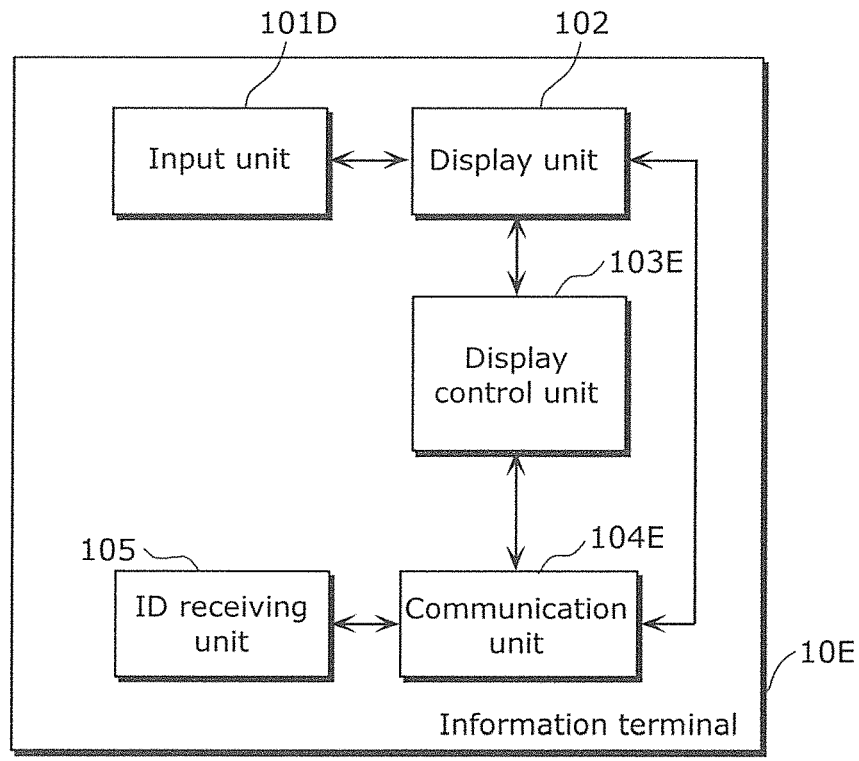
FIG. 31 is a block diagram showing an exemplary configuration of an information terminal according to Embodiment 6.

FIG. 31 is a block diagram showing an exemplary configuration of an information terminal according to Embodiment 6. It is to be noted that the same reference signs are assigned to the same structural elements as those in FIGS. 13A and 25, and descriptions thereof are omitted.

An information terminal 10E shown in FIG. 31 differs from the information terminal 10D according to Embodiment 5 in the lack of the attribute information management unit 107 and in functions of a display control unit 103E and a communication unit 104E.

The display control unit 103E obtains a product information item (a specific product information item) received from the server 40E and transmits the obtained specific product information item to the display unit 102.

It is to be noted that, as with Embodiment 5, the display control unit 103E may receive product information items displayed on the display 20.

The communication unit 104E communicates with the server 40E via the network 30. Specifically, the communication unit 104E transmits ID information obtained from the display 20 and user information received by the input unit 101, to the server 40E. The communication unit 104E receives, from the server 40E, a product information item (a specific product information item) suitable for attribute information about the user and transmits the product information item to the display control unit 103E.

As stated above, even when not selecting a desired area of the screen of the display 20 such as a digital signage, the user using the information terminal 10E can obtain the information desired by the user from the display 20 without taking much time, and cause the information terminal 10E to display the information. In other words, the information terminal 10E is capable of: obtaining, among the product information items, the product information item suitable for the attribute information about the user through visible light communication with the display 20, which displays the product information items, by the information terminal 10E being held toward the screen of the display 20; and displaying the product information item on the display unit 102.

6.2 Configuration of Server 40E

Figure 32:
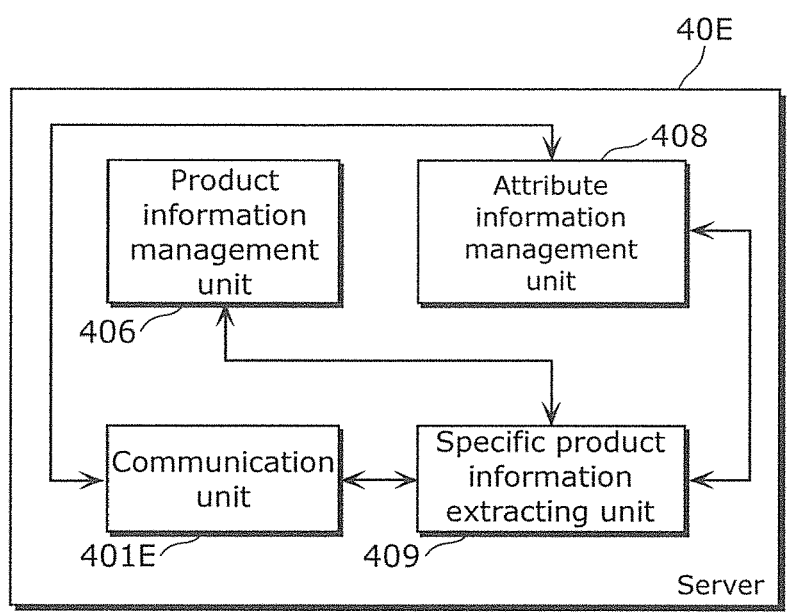
FIG. 32 is a block diagram showing an exemplary configuration of a server according to Embodiment 6.

FIG. 32 is a block diagram showing an exemplary configuration of a server according to Embodiment 6. It is to be noted that the same reference signs are assigned to the same structural elements as those in FIG. 26, and descriptions thereof are omitted.

The server 40E shown in FIG. 32 differs from the server 40D according to Embodiment 5 in an attribute information management unit 408 and a specific product information extracting unit 409 and in functions of a communication unit 401E.

The attribute information management unit 408 manages user information and attribute information about the user in association with each other. In this embodiment, the attribute information management unit 408 stores user information and attribute information about the user that are inputted with the information terminal 10E, and manages the user information and the attribute information in association with each other.

The specific product information extracting unit 409 obtains the attribute information about the user stored (managed) in the attribute information management unit 408 and transmitted by the information terminal 10E. The specific product information extracting unit 409 identifies, as information items associated with the ID information transmitted by the information terminal 10E (ID information transmitted by the display 20), the product information items displayed on the display 20. When the identified product information items include the product information item suitable for the attribute information about the user, the specific product information extracting unit 409 extracts the product information item as a specific product information item and transmits the specific product information item to the information terminal 10E via the communication unit 401E.

In this way, the specific product information extracting unit 409 extracts the specific product information item based on the ID information and the attribute information about the user that are obtained.

The communication unit 401E communicates with the information terminal 10E via the network 30. Specifically, the communication unit 401E receives the ID information and the attribute information about the user transmitted by the information terminal 10E. Moreover, the communication unit 401E transmits, to the information terminal 10E, the specific product information item thus extracted based on the ID information and the attribute information by the specific product information extracting unit 409.

As stated above, the server 40E extracts the specific product information item based on the ID information transmitted by the information terminal 10E and the attribute information managed by the attribute information management unit 408, and transmits the specific product information item to the information terminal 10E.

6.3 Operations of Display System

Next, operations of a display system in this embodiment are described.

Figure 33:
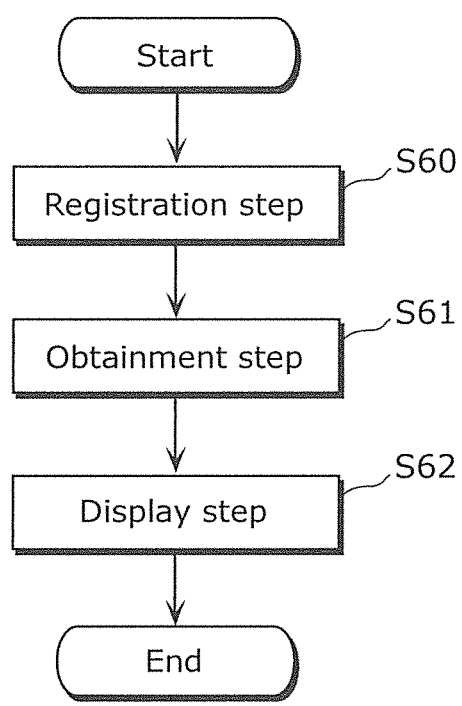
FIG. 33 is a flow chart showing a processing flow of a display method performed by a display system according to Embodiment 6.

FIG. 33 is a flow chart showing a processing flow of a display method performed by the display system according to Embodiment 6.

First, a user performs a registration step using the information terminal 10E, for instance (S60). More specifically, the user uses the information terminal 10E to register attribute information about the user with the information terminal 10E.

In this embodiment, S60 includes a storage step for storing attribute information about the user into the server 40E.

Next, the information terminal 10E and the server 40E perform an obtainment step (S61). More specifically, by the user holding the information terminal 10E toward the screen of the display 20 that displays product information items, the information terminal 10E performs visible light communication with the display 20. Then, the server 40E identifies the product information items, extracts a specific product information item, and transmits the specific product information item to the information terminal 10E. As a result, the information terminal 10E obtains the product information item (the specific product information item).

Next, the information terminal 10E performs a display step (S62). More specifically, the information terminal 10E displays the specific product information item obtained in S61 on the display unit 102 of the information terminal 10E.

Next, a more specific processing flow of the display system according to Embodiment 6 is described.

Figure 34:
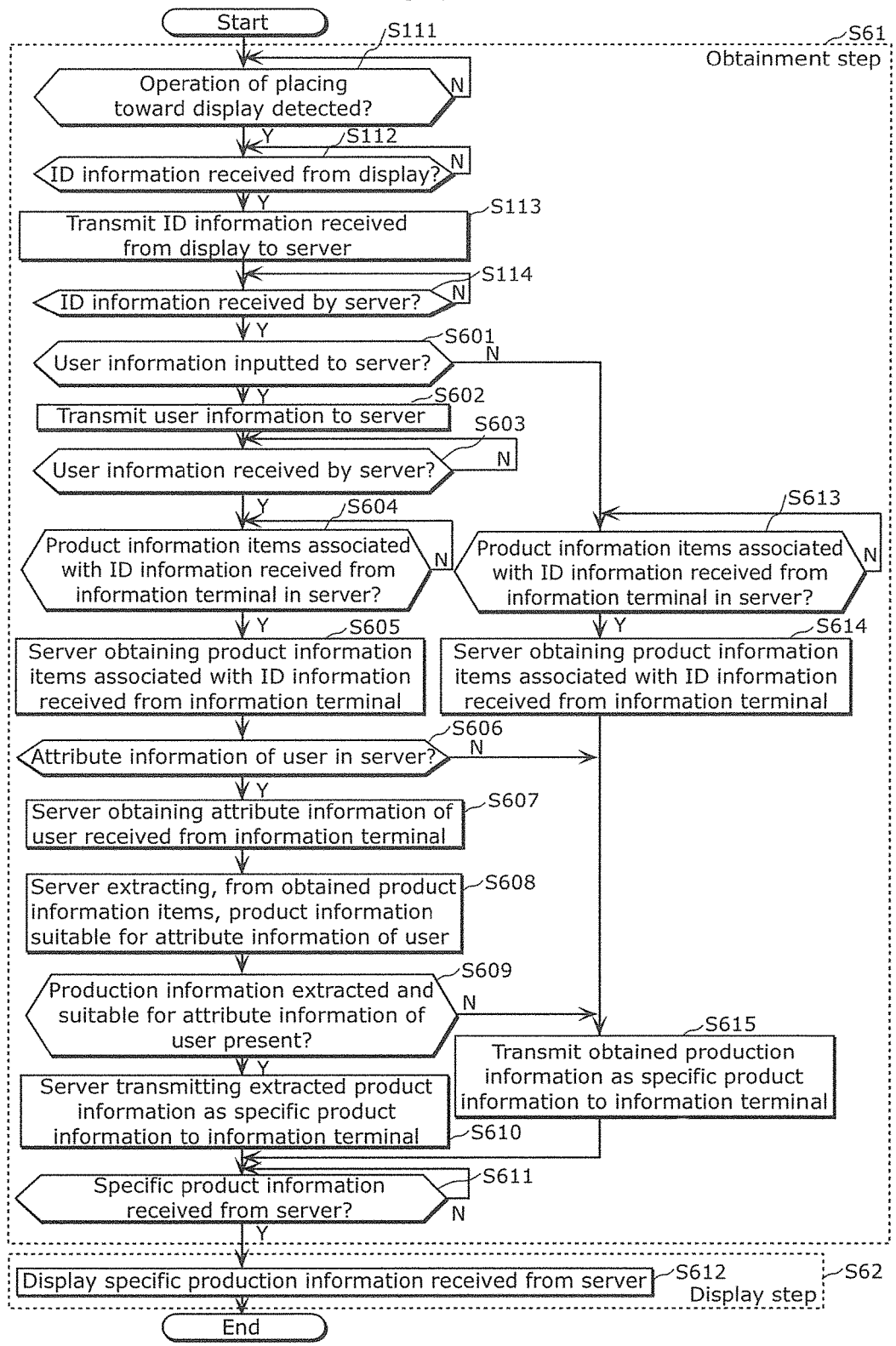
FIG. 34 is a flow chart showing a specific processing flow of the display method according to Embodiment 6.

FIG. 34 is a flow chart showing a specific processing flow of the display method according to Embodiment 6. It is to be noted that the same reference signs are assigned to the same structural elements as those in FIGS. 15 and 28, and descriptions thereof are omitted.

Here, it is assumed that the registration step of S60 has been completed. It is also assumed that the user performs an operation of holding the information terminal 10E toward the display 20 to determine whether information suitable for the user is present by looking at the display 20 as shown in FIG. 24.

Assuming that the server 40A and the information terminal 10A are the server 40E and the information terminal 10E respectively, S111 to S603 shown in FIG. 31 are the same as S111 to S213 shown in FIG. 15. Thus, descriptions of S111 to S603 are omitted.

Moreover, assuming that the server 40A, the information terminal 10A, the transmission event information items, and the related information are the server 40E, the information terminal 10E, the transmission product information items, and the specific product information respectively, S604 to S607 and S610 to S615 shown in FIG. 31 are the same as S115 to S218, S221 to S223, and S215 to S220 shown in FIG. 15. Thus, descriptions of S604 to S607 and S610 to S615 are omitted.

Furthermore, assuming that the server 40A and the information terminal 10A are the server 40E and the information terminal 10E respectively, and processing is performed not by the information terminal 10E but by the server 40E, S608 and S609 shown in FIG. 31 are the same as S505 and S506 shown in FIG. 28. Thus, descriptions of S608 and S609 are omitted.

6.4 Effect

As stated above, according to Embodiment 6, the server 40E manages the attribute information about the user and extracts the product information item (the specific product information item) suitable for the attribute information. By holding the information terminal 10E toward the screen of the display 20, the user can cause the display unit 102 of the information terminal 10E to display, among the product information items, the specific product information item suitable for the attribute information about the user.

With this, even when not selecting a desired area of the screen of the display 20 such as a digital signage, the user using the information terminal 10E can obtain the information desired by the user from the display 20 without taking much time, and cause the information terminal 10E to display the information.

(Other Embodiments)

Although the display method and the display system according to the above embodiments have been described, the present invention is not limited to the embodiments.

(1) Although when the transmission event information items include the related information, the related information is displayed on the display unit 102 of the information terminal 10 or the like in Embodiments 1 to 4, the present invention is not limited to this. When transmission event information items include related information but part of the related information is different (changed), an alert may be sent to notify the different part of the related information.

Figure 35:
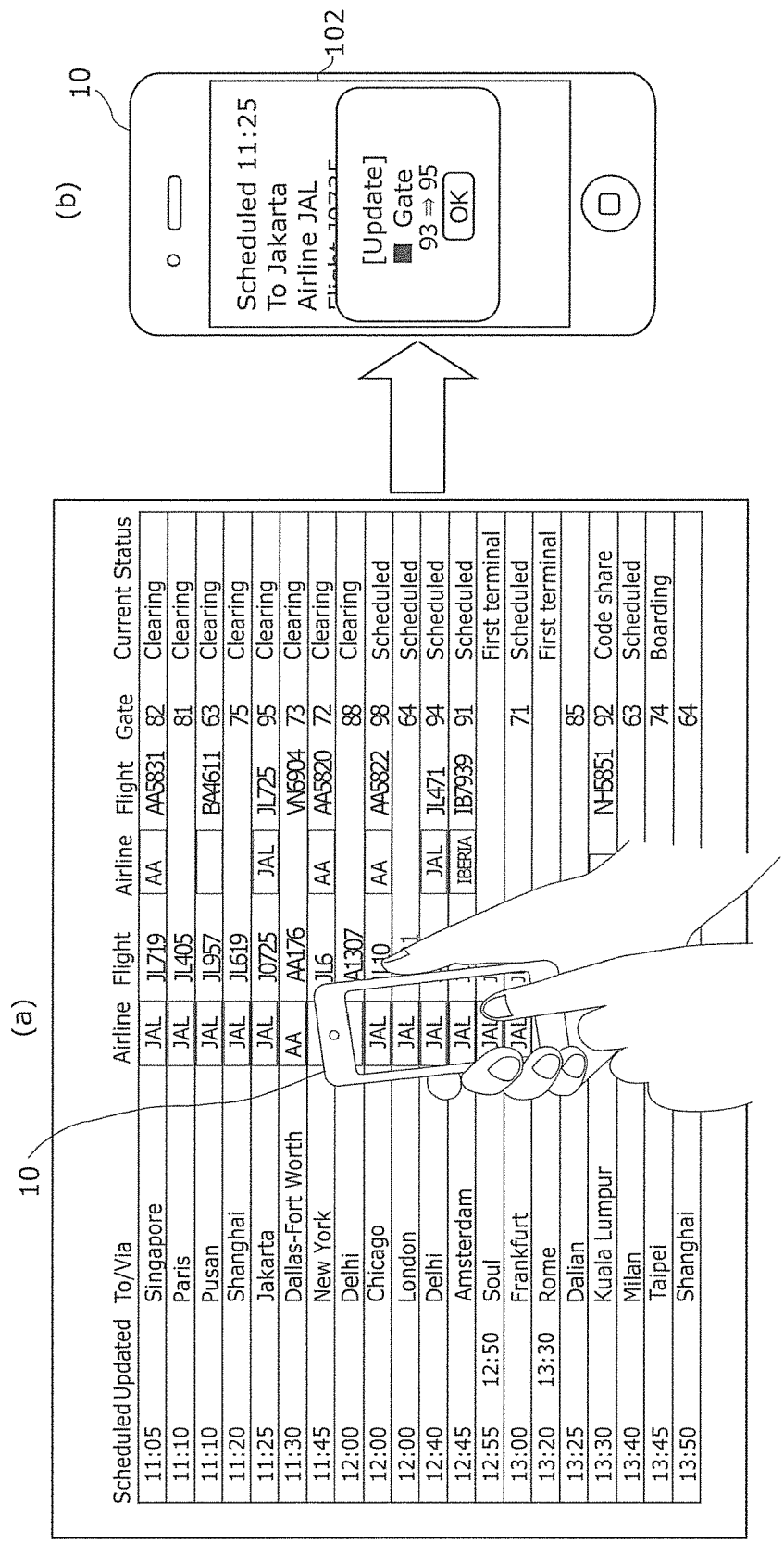
FIG. 35 is a diagram showing an exemplary alert displayed on a display unit of an information terminal according to an other embodiment.
Figure 36:
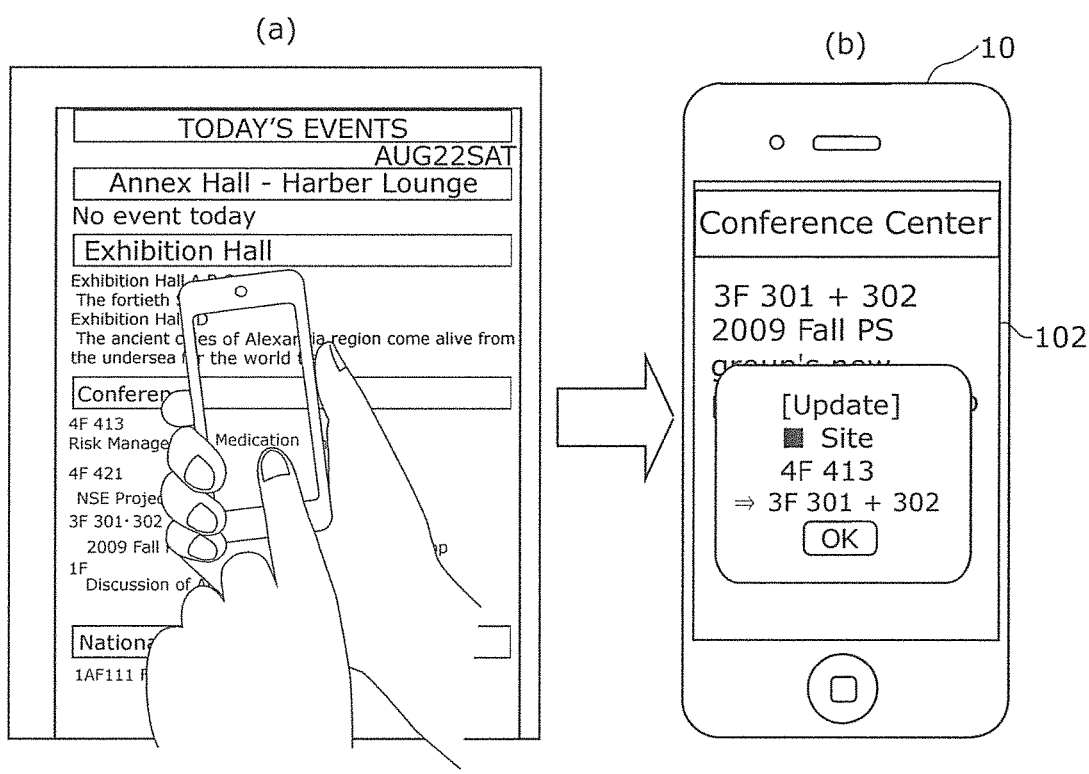
FIG. 36 is a diagram showing an exemplary alert displayed on a display unit of an information terminal according to an other embodiment.
Figure 37:
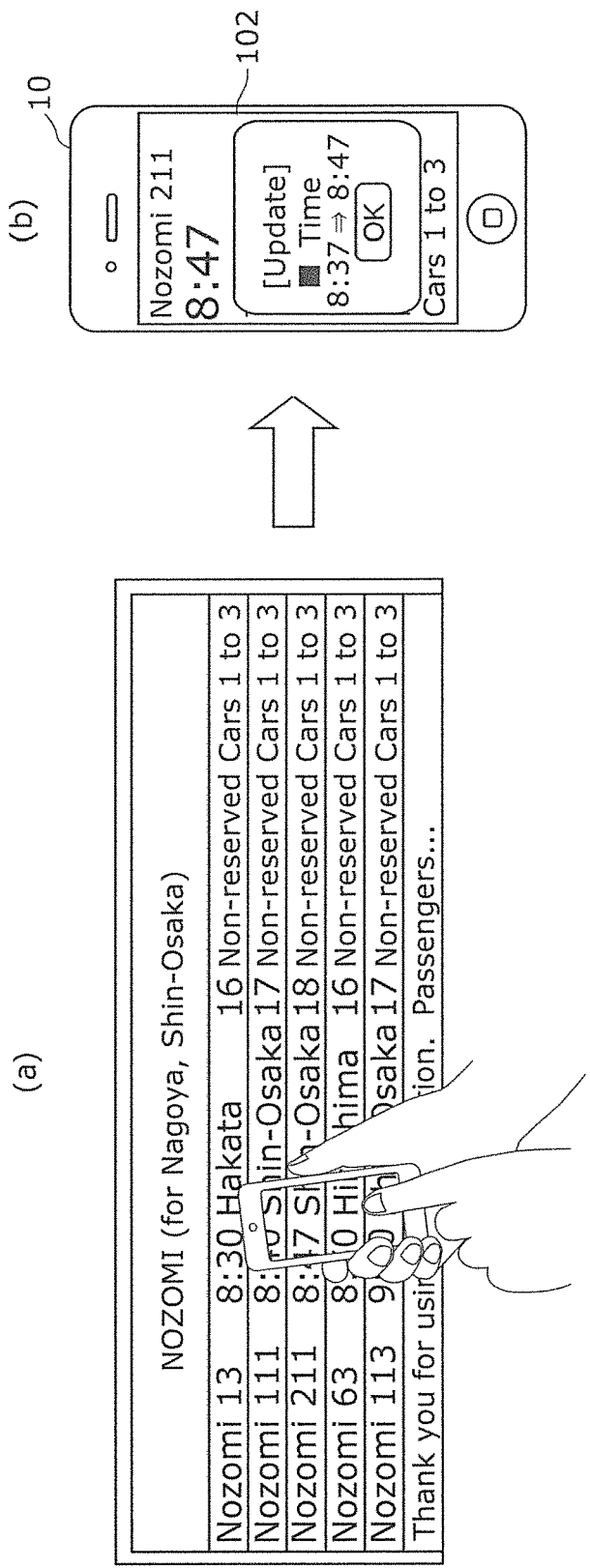
FIG. 37 is a diagram showing an exemplary alert displayed on a display unit of an information terminal according to an other embodiment.

Each of FIGS. 35 to 37 is a diagram showing an exemplary alert displayed on a display unit of an information terminal according to an other embodiment. In other words, as is obvious from the comparison with FIGS. 9 to 11, when part of related information is changed in each of FIGS. 35 to 37, the changed information is sent as "Update" to the user (the user is alerted).

Figure 38:
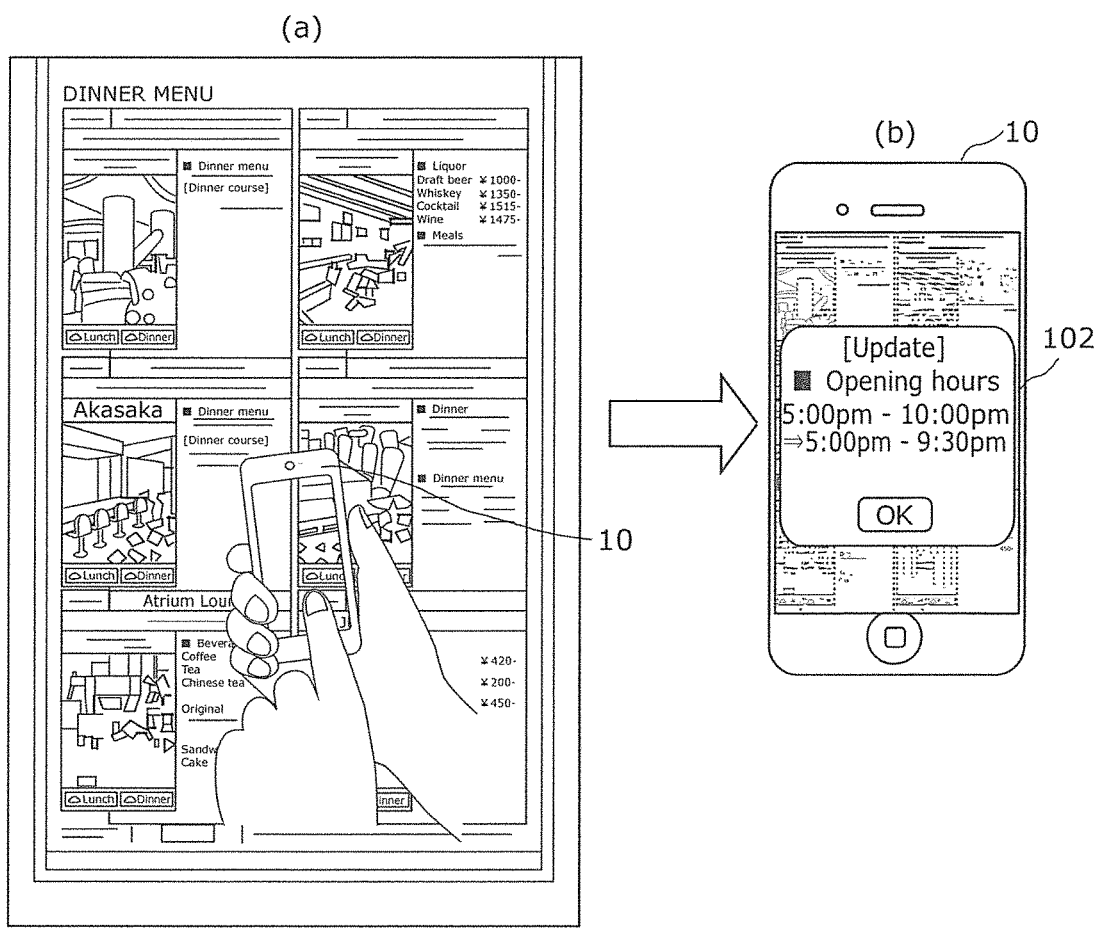
FIG. 38 is a diagram showing an exemplary alert displayed on a display unit of an information terminal according to an other embodiment.

(2) Although, similar to (1), when the transmission product information items include the product information item suitable for the attribute information about the user, the product information item (the specific product information item) is displayed on the display unit 102 of the information terminal 10D or the like in Embodiments 5 and 6, the present invention is not limited to this. As shown in FIG. 38, when transmission product information items include a product information item (a specific product information item) suitable for attribute information about the user but part of the product information item (the specific product information item) is changed, an alert may be sent to notify the changed part of the specific product information item. Here, FIG. 38 is a diagram showing an exemplary alert displayed on a display unit of an information terminal according to an other embodiment.

(3) The contents of the alert in (2) are not limited to the case where the part of the specific product information item is changed. When a price included in the specific product information item is lowest (the lowest price) among prices included in past specific product information items, an alert may be sent.

More specifically, in the case where product information items include product prices, and further past product information items obtained are recorded, the information terminal 10D or the like may send an alert when a price included in extracted specific product information item is lower than the prices included in the product information items corresponding to specific product information items included in the past product information items.

Here, FIG. 39 is a diagram showing an exemplary alert displayed on a display unit of an information terminal according to an other embodiment. In other words, for instance, as shown in FIG. 39, when a price included in a specific product information item is lower than the past lowest price, a bargain price and a product name may be alerted. With this, the user is likely to purchase a product suitable for user's preferences. (A willingness to buy is increased.)

(4) The contents of the alert in (2) are not limited to the case where the part of the specific product information item is changed. For example, when a product indicated in a specific product information item is not available (out of stock) at a store to which the display 20 that displays products belongs, a web site which allows purchase of the product indicated in the specific product information item may be displayed in stead of the specific product information item.

More specifically, in the case where a product information item includes product stock information, the information terminal 10E or the like may cause the display unit 102 to display a web site for online shopping instead of the specific product information item, when confirming based on the product stock information that the product indicated in the extracted specific product information item is out of stock.

Here, FIG. 40 is a diagram showing an exemplary alert displayed on a display unit of an information terminal according to an other embodiment. In other words, for instance, as shown in FIG. 40, when a product indicated in a specific product information item is out of stock at a store to which the display 20 belongs, a web site for online shopping may be displayed on the display unit 102 instead of the specific product information item. With this, the user is likely to purchase a product suitable for user's preferences. (A willingness to buy is increased.)

(5) Although Embodiments 1 to 4 have described the case where when the transmission event information items include the related information, the related information is displayed on the display unit 102 of the information terminal 10 or the like, the present invention is not limited to this. When transmission event information items include related information, the related information may be further translated into a display language selected based on language information for selecting a display language to be displayed on the display unit 102 of the information terminal 10 or the like, and displayed.

Here, the display language to be selected may be an official language of an area where the information terminal 10 is present such as Spanish, Japanese, and English, or may be the language most used in an area where the information terminal 10 is present. Moreover, the display language to be selected may be a native language of a user using the information terminal 10 or may be not a language previously set to the information terminal 10 but a language set to a server from which the information terminal 10 or the like obtains information.

As stated above, by matching a language used to show related information and a display language or translating, when the both languages are different, the language into the display language and displaying the display language, it is possible to display information desired by the user in the language suitable for the user.

(6) Although Embodiments 5 and 6 have described the case where when the transmission product information items include the product information item suitable for the attribute information about the user, the product information item (the specific product information item) is displayed on the display unit 102 of the information terminal 10D or the like, the present invention is not limited to this. Attribute information may further include language information for selecting a display language to be displayed on the display unit 102 of the information terminal 10 or the like.

In this case, when transmission product information items include a product information item suitable for the attribute information about the user, the product information item (the specific product information item) may be translated into a display language selected based on the language information, and displayed.

Here, as with (5) above, the display language to be selected may be an official language of an area where the information terminal 10 is present such as Spanish, Japanese, and English, or may be the language most used in an area where the information terminal 10 is present. Moreover, the display language to be selected may be a native language of a user using the information terminal 10, may be an official language of a country to which the user belongs, or may be not a language previously set to the information terminal 10 but a language set to a server from which the information terminal 10 or the like obtains information.

As stated above, by matching a language used to show related information and a display language or translating, when the both languages are different, the language into the display language and displaying the display language, it is possible to display information desired by the user in the language suitable for the user.

Although the display method and the display system according to one or more aspects of the present invention have been described above based on the embodiments, the present invention is not limited to the embodiments. Those skilled in the art will readily appreciate that various modifications may be made in the embodiments and that other embodiments may be obtained by combining the structural elements in the different embodiments, without departing from the spirit of the present invention. Accordingly, all such modifications and embodiments may be included in the scope of the one or more aspects of the present invention.

For instance, the following cases may be included in the scope of the one or more aspects of the present invention.

(1) In each of the above embodiments, each of the structural elements may include dedicated hardware or may be implemented by executing a software program suitable for each structural element. Each structural element may be implemented by a program executing unit such as a CPU and a processor reading and executing a software program recorded on a recording medium such as a hard disk and a semiconductor memory.

(2) Part or all of the structural elements included in the display system in each of the embodiments may be realized as a single system Large Scale Integration (LSI).

The system LSI is a super multifunctional LSI manufactured by integrating a plurality of components onto a single chip. Specifically, the system LSI is a computer system including a microprocessor, a read-only memory (ROM), a random-access memory (RAM), and so on. A computer program is stored in the ROM. The microprocessor operates according to the computer program to carry out its function.

The name used here is the system LSI, but it may also be called IC, LSI, super LSI, or ultra LSI depending on the degree of integration. Moreover, ways to achieve integration are not limited to the LSI, and a dedicated circuit or a general-purpose processor may achieve the integration. Field Programmable Gate Array (FPGA) that can be programmed after manufacturing LSIs or a reconfigurable processor that allows re-configuration of the connection or configuration of an LSI can be used for the same purpose.

Additionally, if a new circuit integration technique is introduced in place of the LSI along with development in semiconductor technology or other derivative technology, it is obvious that the technique may be used for integrating functional blocks. There is a possibility of applying biotechnology and the like.

(3) In each of the above embodiments, the information terminal that performs a service application and the information terminal that performs visible light communication with a display may be different terminals.

(4) In the displaying in each of the above embodiments, when language information of the event information items obtained from the display is different from language information of the service application information, the event information items may be translated using the language information of the service application information, then it may be determined whether the event information items include the related information of the service application information, and when the event information items include the related information of the service application information, the related information of the service application information may be displayed on the information terminal.

(5) In the displaying in each of the above embodiments, an input screen enabling change of service application information, cancellation, and an additional application may be additionally displayed along with information related to the service application information or an alert.

(6) A method for recognizing the display at a time of obtaining the event information items in the obtaining in each of the above embodiments is not limited to visible light communication. For instance, the display may be recognized by: image recognition using an image feature amount obtained by captured image analysis of the display captured by the information terminal; acoustic wave communication performed by an acoustic wave generating device provided to the display; proximity wireless communication using Bluetooth (registered trademark) function built-in the display or near field communication (NFC) function; wireless communication via an access point of a wireless local area network (LAN) provided near the display; image analysis using an image marker or a radio frequency identification (RFID) tag provided to the display; position detection using the indoor messaging system (IMES), the global positioning system (GPS), and a cell tower; and so on.

(7) Moreover, in Embodiments 1 to 4, when the service application information is not in the information terminal or the server, (a) the event information items obtained from the display may be directly displayed, (b) notice information about a service related to the display or an input screen enabling a service application may be displayed, or (c) (a) and (b) may be displayed in combination.

(8) Furthermore, although the service application information is in the information terminal or the server in Embodiments 1 to 4, when the event information items obtained from the display do not include the related information of the service application information, (a) the event information items obtained from the display may be directly displayed or (b) the input screen enabling change of service application information, cancellation, and an additional application may be displayed. Moreover, (c) when event information items to be displayed on the display are searched for related information of service application information, and event information items including service information as related information are present, a time until the event information items are displayed on the display may be displayed, e.g. "information related to your service application information will be displayed X minutes later." and "information related to your service application information will be displayed at Z minutes past Y." Furthermore, (d) when event information items to be displayed on the display are searched for related information of service application information, and event information items including the service application information are present, the related information of the service application information may be displayed. It is to be noted that (a), (b), (c), and (d) may be displayed in combination.

(9) Moreover, the information terminal that inputs the attribute information about the user and the information terminal that performs visible light communication with the display may be different terminals.

(10) In the displaying in Embodiments 5 and 6, when language information of the product information items obtained from the display is different from language information of the attribute information, the product information items may be translated using the language information of the attribute information, then it may be determined whether the product information items include a product information item suitable for the attribute information, and when the product information items include the product information item suitable for the attribute information, the product information item suitable for the attribute information may be displayed on the information terminal.

(11) Furthermore, in the displaying in Embodiments 5 and 6, an input screen enabling a reservation for or a purchase of a product suitable for attribute information may be additionally displayed along with a product information item suitable for the attribute information or an alert.

(12) A method for recognizing the display at a time of obtaining the product information items in the obtaining in Embodiments 5 and 6 is not limited to visible light communication. As with (6) above, the display may be recognized by: image recognition using an image feature amount obtained by captured image analysis of the display captured by the information terminal; acoustic wave communication performed by an acoustic wave generating device provided to the display; proximity wireless communication using Bluetooth (registered trademark) function or near field communication (NFC) function included in the display; wireless communication via an access point of a wireless local area network (LAN) provided near the display; image analysis using an image marker or a radio frequency identification (RFID) tag provided to the display; position detection using the indoor messaging system (IMES), the global positioning system (GPS), and a cell tower; and so on.

(13) Moreover, when the attribute information about the user is not present in Embodiments 5 and 6, (a) the product information items obtained from the display may be directly displayed or (b) an input screen for inputting attribute information about the user may be displayed. In addition, (a) and (b) may be displayed in combination.

(14) Furthermore, when the attribute information about the user is in the information terminal but the product information items obtained from the display do not include the product information item suitable for the attribute information in Embodiments 5 and 6, (a) the product information items obtained from the display may be directly displayed or (b) an input screen enabling additional input of attribute information may be displayed. Moreover, (c) when product information items to be displayed on the display are searched for a product information item suitable for attribute information, and the product information items including the product information item suitable for the attribute information are present, a time until the product information items are displayed on the display may be displayed, e.g. "product information suitable for your attribute information will be displayed W days later." and "product information suitable for your attribute information will be displayed Y minutes past X." Furthermore, (d) when product information items to be displayed on the display are searched for a product information item suitable for attribute information, and the product information items including the product information item suitable for the attribute information are present, the product information item suitable for the attribute information may be displayed. It is to be noted that (a), (b), (c), and (d) may be displayed in combination.

INDUSTRIAL APPLICABILITY

The present invention can be applied to display methods, and particularly to a display method capable of displaying, using a mobile terminal such as a smart phone, information desired by a user only by holding the mobile terminal toward a digital signage or the like.

The invention claimed is:
1. A display method comprising:
performing a service application for a specific event using an information terminal;
after the performing the service application, when the information terminal is positioned toward a display apparatus separate from the information terminal, receiving, by visible light communication between the information terminal and the display apparatus, ID information that is transmitted in a pattern of light from the display apparatus to the information terminal during the visible light communication, the ID information being associated with a plurality of event information items displayed on a display of the display apparatus;
via a network, transmitting, from the information terminal to a server, the ID information including the associated plurality of event information items received in the receiving;
receiving a result of a comparison performed in the server of comparing the plurality of event information items associated with ID information with a user information item stored in the server;
when any of the plurality of event information items associated with the ID information transmitted in the transmitting to the server matches the user information item stored in the server, obtaining, from the server, only a specific event information item, from among the plurality of event information items, that is determined to match the user information item related to the specific event;

displaying, on a display of the information terminal, a modified display of the plurality of event information items, the modified display of the plurality of event information items that is displayed during the displaying showing the specific event information item related to the specific event on the display of the information terminal in a state that the plurality of event information items, except for the specific event information item related to the specific event, is grayed out on the display of the information terminal; and displaying, on the display of the information terminal, an input screen enabling a change of service application information based on the plurality of event information items associated with the ID information transmitted in the transmitting to the server not matching the user information item stored on the server.

2. The display method according to claim 1,
wherein the service application includes at least one of: a reservation and purchase of an exhibition ticket; a reservation and purchase of an exposition ticket; a reservation and purchase of a show ticket; a reservation and purchase of a concert ticket; a reservation and purchase of an entry or audience ticket for an athletic event; a reservation and purchase of a lecture ticket; a reservation for a seminar; a reservation at a restaurant; a reservation for and a purchase of an automobile; a reservation and purchase of a boarding ticket; a reservation and purchase of an airplane ticket; or a reservation and purchase of a boat ticket.

3. The display method according to claim 1,
wherein in the displaying, when at least part of contents of the service application included in the specific event information item is changed, information about the at least changed part of the contents is displayed larger than information about a remaining part of the contents that is not changed.

4. The display method according to claim 2,
wherein in the displaying, the specific event information item is further translated into a display language which is stored in the information terminal and the translated specific event information item is displayed on the display of the information terminal.

5. The display method according to claim 1,
wherein each of the plurality of event information items has an event starting time, and
in the displaying, the plurality of event information items is displayed in an event starting time order.

6. An apparatus comprising:
a processor; and
a memory storing thereon a computer program, which when executed by the processor, causes the processor to perform operations including:
performing a service application for a specific event using an information terminal;
after the performing the service application, when the information terminal is positioned toward a display apparatus separate from the information terminal, receiving, by visible light communication between the information terminal and the display apparatus, ID information that is transmitted in a pattern of light from the display apparatus to the information terminal during the visible light communication, the ID information being associated with a plurality of event information items displayed on a display of the display apparatus;
via a network, transmitting, from the information terminal to a server, the ID information including the associated plurality of event information items received in the receiving;
receiving a result of a comparison performed in the server of comparing the plurality of event information items associated with ID information with a user information item stored in the server;
when any of the plurality of event information items associated with the ID information transmitted in the transmitting to the server matches the user information item stored in the server, obtaining, from the server, only a specific event information item, from among the plurality of event information items, that are determined to match the user information item related to the specific event;
displaying, on a display of the information terminal, a modified display of the plurality of event information items, the modified display of the plurality of event information items that is displayed during the displaying showing the specific event information item related to the specific event on the display of the information terminal in a state that the plurality of event information items, except for the specific event information item related to the specific event, is grayed out on the display of the information terminal; and
when the plurality of event information items associated with the ID information transmitted in the transmitting to the server does not match the user information item stored in the server, displaying, on the display of the information terminal, an input screen enabling a change of service application information.

7. A non-transitory recording medium storing thereon a computer program, which when executed by the processor, causes the processor to perform operations including:
performing a service application for a specific event using an information terminal;
after the performing the service application, when the information terminal is positioned toward a display apparatus separate from the information terminal, receiving, by visible light communication between the information terminal and the display apparatus, ID information that is transmitted in a pattern of light from the display apparatus to the information terminal during the visible light communication, the ID information being associated with a plurality of event information items displayed on a display of the display apparatus;
via a network, transmitting, from the information terminal to a server, the ID information including the associated plurality of event information items received in the receiving;
receiving a result of a comparison performed in the server of comparing the plurality of event information items associated with ID information with a user information item stored in the server;
when any of the plurality of event information items associated with the ID information transmitted in the transmitting to the server matches the user information item stored in the server, obtaining, from the server, only a specific event information item, from among the plurality of event information items, that are determined to match the user information item related to the specific event;
displaying, on a display of the information terminal, a modified display of the plurality of event information items, the modified display of the plurality of event information items that is displayed during the displaying showing the specific event information items related to the specific event on the display of the information terminal in a state that the plurality of event information items, except for the specific event information items related to the specific event, is grayed out on the display of the information terminal; and when the plurality of event information items associated with the ID information transmitted in the transmitting to the server does not match the user information item stored in the server, displaying, on the display of the information terminal, an input screen enabling a change of service application information.

\* \* \* \* \*